(12) United States Patent
Knipmeyer et al.

(10) Patent No.: US 8,167,141 B2
(45) Date of Patent: May 1, 2012

(54) GRAVITY FLOW FILTER

(75) Inventors: Elizabeth L. Knipmeyer, Pleasanton, CA (US); Toni L. Lynch, Pleasanton, CA (US); Roger P. Reid, Caldwell, ID (US); Bruce D. Saaski, Caldwell, ID (US)

(73) Assignee: Brita LP, Oakland, CA (US)

( * ) Notice: Subject to any disclaimer, the term of this patent is extended or adjusted under 35 U.S.C. 154(b) by 903 days.

(21) Appl. No.: 12/207,284

(22) Filed: Sep. 9, 2008

(65) Prior Publication Data

US 2009/0001011 A1    Jan. 1, 2009

Related U.S. Application Data

(63) Continuation-in-part of application No. 11/858,765, filed on Sep. 20, 2007, and a continuation-in-part of application No. 11/927,372, filed on Oct. 29, 2007, which is a continuation-in-part of application No. 10/881,517, filed on Jun. 30, 2004, now abandoned.

(60) Provisional application No. 60/846,162, filed on Sep. 20, 2006.

(51) Int. Cl.
*B01D 27/02* (2006.01)
*B01D 39/02* (2006.01)
*B01D 24/00* (2006.01)

(52) U.S. Cl. ........ 210/464; 210/266; 210/282; 210/486; 210/502.1; 210/283

(58) Field of Classification Search ........................ None
See application file for complete search history.

(56) References Cited

U.S. PATENT DOCUMENTS

| | | |
|---|---|---|
| 3,375,933 A | 4/1968 | Rodman |
| 3,538,020 A | 11/1970 | Heskett et al. |
| 3,721,072 A | 3/1973 | Clapham |

(Continued)

FOREIGN PATENT DOCUMENTS

EP    1354857 A4    10/2003

(Continued)

OTHER PUBLICATIONS

Bear, Jacob, "Dynamics of Fluids in Porous Media", American Elsevier Publishing Company Inc., 1972, pp. 45-47.

(Continued)

*Primary Examiner* — Nam Nguyen
*Assistant Examiner* — Madeline Gonzalez
(74) *Attorney, Agent, or Firm* — Stacy H. Combs

(57) ABSTRACT

A gravity-fed carbon block water filter in one embodiment includes a filter block comprising multiple sub-blocks each comprising filter media walls surrounding and defining a cavity for receiving fluid. Each of the sub-blocks is connected to at least one other of the sub-blocks by filter media of which the filter block is made. In one approach, the filter media includes about 20-90 wt % activated carbon, and about 5-50 wt % binder. In another approach, a lead concentration in a final liter of effluent water filtered by the filter is less than about 10 μg/liter after about 151 liters (40 gallons) of source water filtration, the source water having a pH of 8.5 and containing 135-165 ppb total lead with 30-60 ppb being colloidal lead greater than 0.1 μm in diameter. A gravity-fed water filter in other embodiments has no specified shape but achieves a FRAP factor of about 350 or less.

24 Claims, 27 Drawing Sheets

U.S. PATENT DOCUMENTS

| | | | |
|---|---|---|---|
| 4,664,683 A | 5/1987 | Degen et al. | |
| 4,665,050 A | 5/1987 | Degen et al. | |
| 4,753,728 A | 6/1988 | VanderBilt | |
| 4,859,386 A | 8/1989 | VanderBilt | |
| 4,980,073 A | 12/1990 | Woodruff | |
| 5,017,318 A | 5/1991 | VanderBilt | |
| 5,019,311 A | 5/1991 | Koslow | |
| 5,024,764 A | 6/1991 | Holler | |
| 5,076,912 A | 12/1991 | Belz | |
| 5,147,722 A | 9/1992 | Koslow | |
| 5,189,092 A | 2/1993 | Koslow | |
| 5,225,078 A | 7/1993 | Polasky | |
| 5,256,285 A | 10/1993 | Tomita et al. | |
| 5,344,558 A | 9/1994 | Kool | |
| 5,352,274 A | 10/1994 | Blakley | |
| 5,443,735 A | 8/1995 | Kirnbauer et al. | |
| 5,609,759 A | 3/1997 | Nohren, Jr. et al. | |
| 5,679,248 A | 10/1997 | Blaney | |
| D398,184 S | 9/1998 | Silverberg et al. | |
| 5,873,995 A | 2/1999 | Huang et al. | |
| 5,922,803 A | 7/1999 | Koslow | |
| D415,922 S | 11/1999 | Kawasaki et al. | |
| D416,163 S | 11/1999 | Doritty et al. | |
| 6,056,809 A | 5/2000 | Chapman | |
| 6,099,728 A | 8/2000 | Bairischer | |
| 6,165,362 A | 12/2000 | Nohren, Jr. et al. | |
| 6,200,471 B1 | 3/2001 | Nohren, Jr. | |
| RE37,216 E | 6/2001 | Koslow | |
| 6,280,824 B1 | 8/2001 | Insley et al. | |
| 6,290,646 B1 | 9/2001 | Cosentino et al. | |
| 6,290,848 B1 | 9/2001 | Tanner et al. | |
| 6,322,615 B1 | 11/2001 | Chapman | |
| 6,368,504 B1 | 4/2002 | Kuennen | |
| 6,395,190 B1 | 5/2002 | Koslow | |
| 6,413,303 B2 | 7/2002 | Gelderland et al. | |
| 6,524,477 B1 * | 2/2003 | Hughes | 210/282 |
| 6,565,749 B1 | 5/2003 | Hou | |
| 6,569,329 B1 | 5/2003 | Nohren et al. | |
| 6,638,426 B1 | 10/2003 | Fritter et al. | |
| 6,989,101 B2 | 1/2006 | Cumberland et al. | |
| 7,169,466 B2 | 1/2007 | Taylor et al. | |
| 2002/0005377 A1 | 1/2002 | Tanner et al. | |
| 2002/0062740 A1 | 5/2002 | Brukov | |
| 2002/0195407 A1 | 12/2002 | Levy | |
| 2003/0140785 A1 | 7/2003 | Koslow | |
| 2004/0168972 A1 * | 9/2004 | Hughes et al. | 210/502.1 |
| 2004/0195181 A1 | 10/2004 | Loftis | |
| 2005/0072729 A1 | 4/2005 | Bridges et al. | |
| 2005/0167358 A1 | 8/2005 | Rinker et al. | |
| 2005/0172731 A1 | 8/2005 | Anklin et al. | |
| 2006/0000763 A1 * | 1/2006 | Rinker et al. | 210/282 |
| 2007/0215536 A1 | 9/2007 | Bommi et al. | |
| 2008/0023406 A1 * | 1/2008 | Rawson et al. | 210/688 |
| 2008/0110820 A1 * | 5/2008 | Knipmeyer et al. | 210/474 |
| 2008/0223797 A1 * | 9/2008 | Reid et al. | 210/790 |

FOREIGN PATENT DOCUMENTS

| | | |
|---|---|---|
| GB | 2390987 A | 1/2004 |
| IN | 320/MUMNP/2004 | 8/2005 |
| WO | WO98/14265 A1 | 4/1988 |
| WO | WO99/10076 A1 | 3/1999 |
| WO | WO01/23306 A1 | 4/2001 |
| WO | WO02/41970 A1 | 5/2002 |
| WO | WO02/053262 A1 | 7/2002 |
| WO | WO03/048693 A1 | 6/2003 |
| WO | WO2004/000732 A1 | 12/2003 |
| WO | WO2005/094966 A1 | 10/2005 |
| WO | WO2005/095284 A1 | 10/2005 |
| WO | WO2006/037420 A1 | 4/2006 |

OTHER PUBLICATIONS

Drinking Water Treatment Units-Health Effects, prepared by the NSF Joint Committee: NSF/ANSI 53-2007.

* cited by examiner

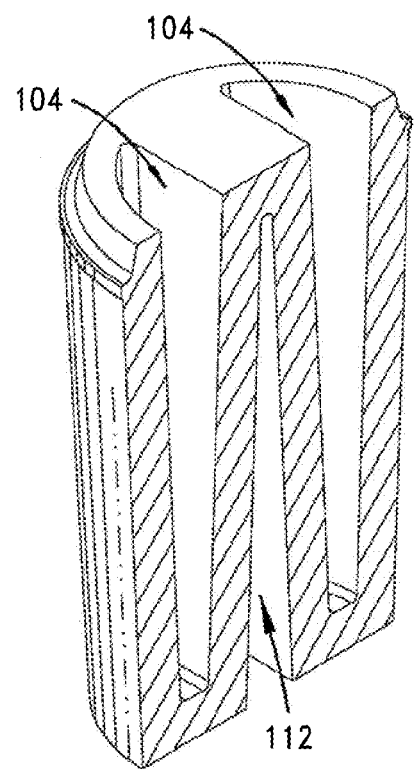
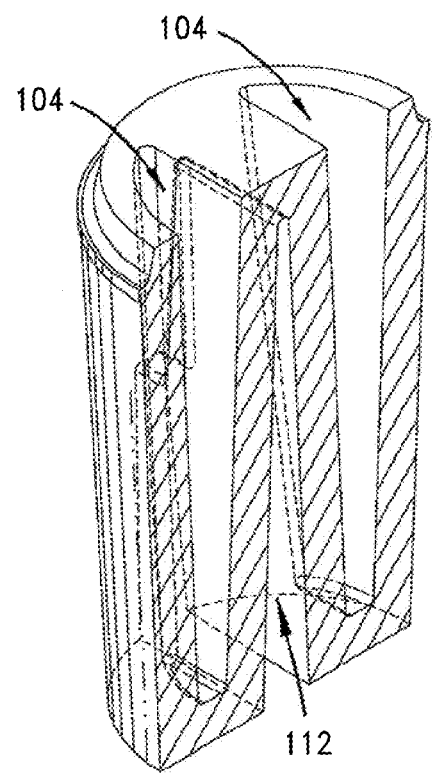
FIG. 10K  FIG. 10L
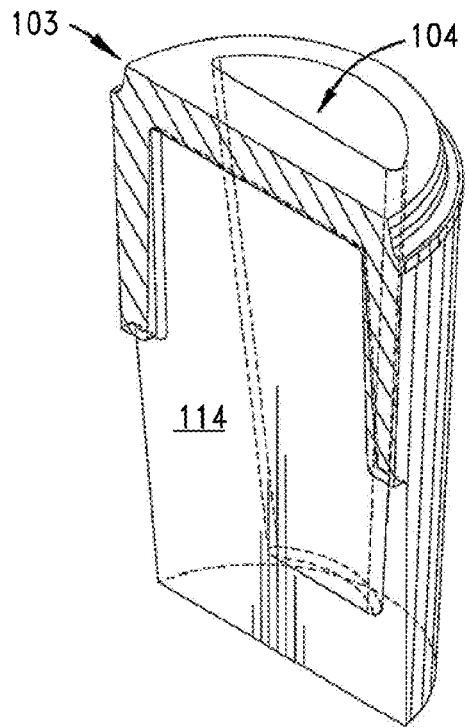
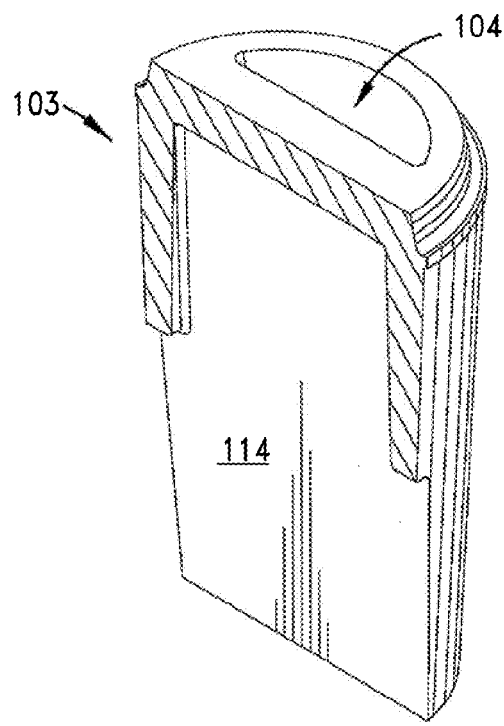
FIG. 10M  FIG. 10N

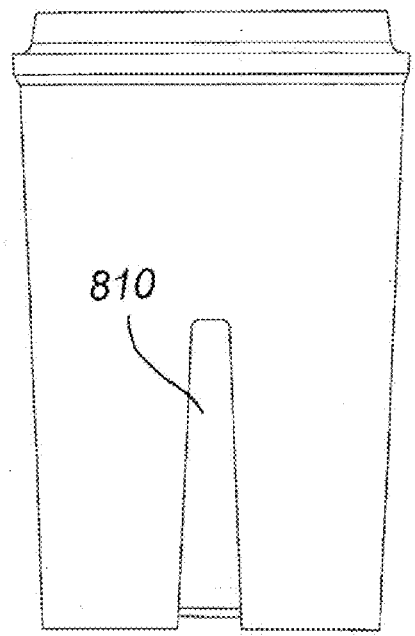
FIG. 16A
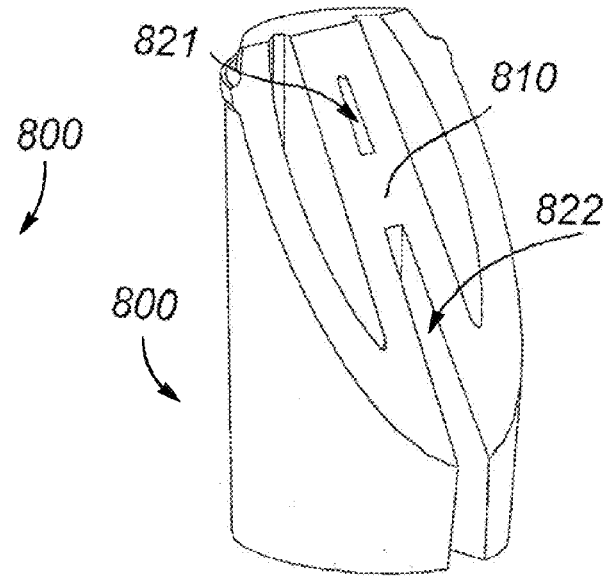
FIG. 16E
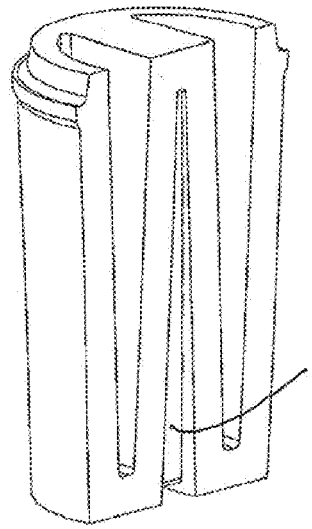
FIG. 16B
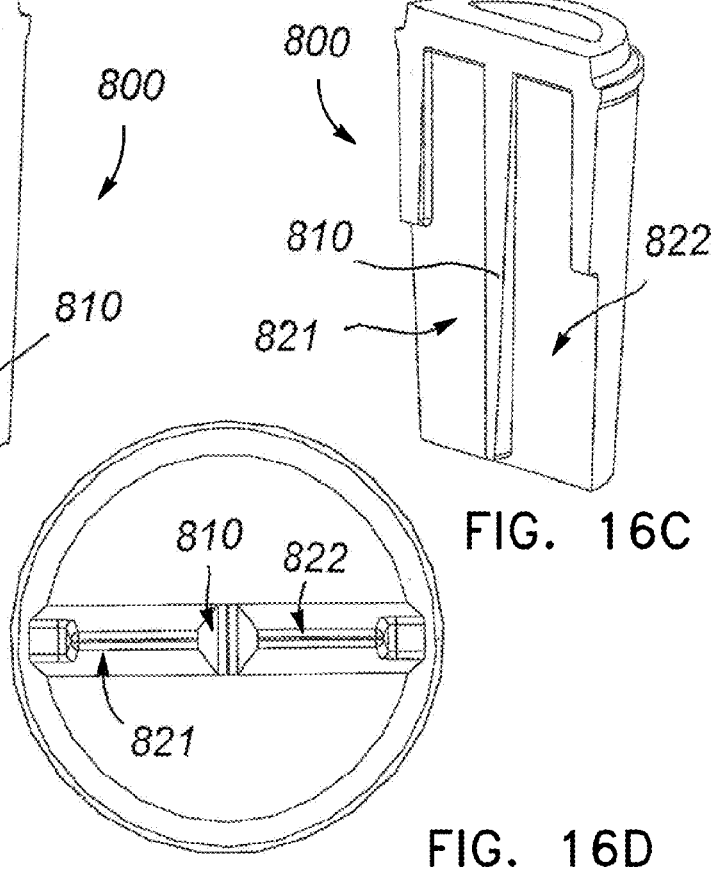
FIG. 16C
FIG. 16D

GRAVITY FLOW FILTER

RELATED APPLICATIONS

This application is a continuation-in-part of application Ser. No. 11/858,765, filed Sep. 20, 2007, which claims the benefit of Provisional Patent Application No. 60/846,162, filed Sep. 20, 2006. This application is continuation-in-part of application Ser. No. 11/927,372, filed Oct. 29, 2007, which is a continuation-in-part of application Ser. No. 10/881,517, filed Jun. 30, 2004 now abandoned.

FIELD OF THE INVENTION

The present invention relates to gravity flow filtration systems, and more particularly, this invention relates to carbon block and granular filters having rapid flow rates and excellent filtration performance.

BACKGROUND OF THE INVENTION

The use of home water treatment systems to treat tap water continues to grow dramatically in the U.S. and abroad, in part because of heightened public awareness of the health concerns associated with the consumption of untreated tap water.

Several different methods are known for filtration of water, and various devices and apparatus have been designed and are commercially available. These methods and devices vary depending on whether the application is for industrial use or for household use.

Water treatment for household use is typically directed to providing safer drinking water. The methods and devices typically used in households for water treatment can be classified into two basic types. One type is a pressurized system, such as a faucet mount system, and typically uses a porous carbon block as part of the filtration system. The other type is a low pressure system, such as a pour-through pitcher system, and typically uses activated carbon granules as part of the filtration system.

Filtration of water in a pressurized system has the advantage of the pressure to drive the filtration through the carbon block and therefore does not usually face problems of achieving desired flow rate while maintaining effective filtration of contaminants. However, when carbon blocks designed for pressurized systems are applied to gravity fed systems, they fail to produce the desired flow rates consistently over time.

Filtration of water in a low pressure system faces the challenge of undesirable contaminants while maintaining a desired high flow rate. However, when carbon blocks designed for pressurized systems are applied to gravity flow systems, they fail to produce the desired flow rates consistently over time.

Gravity flow filtration systems are well known in the art. Such systems include pour-through carafes, water coolers and refrigerator water tanks, which have been developed by The Clorox Company (BRITA®), Culligan™, Rubbermaid™ and Glacier Pure™.

Typically, these systems are filled with tap water from municipal supplies or rural wells, as the user wishes to remove chlorine and/or lead or other contaminants, or to generally improve the taste and odor of the water. These devices continue to be very popular, especially in view of the emphasis on healthy drinking water and in view of the expense and inconvenience of purchasing bottled water.

Prior Filter Blocks

Filter blocks for water filtration comprising granular activated carbon (GAC) and binder, with or without various additives such as lead sorbent, have been commercially available for many years. The raw materials are extruded or compressed into molds to form hollow, cylindrical or "tubular" blocks. Examples of conventional carbon blocks are given in Heskett U.S. Pat. No. 3,538,020, Degen U.S. Pat. Nos. 4,664,683 and 4,665,050, "Amway" U.S. Pat. No. 4,753,728, and Koslow U.S. Pat. Nos. 5,019,311 and 5,147,722 and 5,189,092.

The fluid-flow path through these hollow, cylindrical activated carbon blocks is generally radial. In out-side-in flow schemes, housing structure and internals distribute water to the outer cylindrical surface of the block, and the water flows radially through the inner, cylindrical wall to the hollow axial space at the center axis of the block. From the hollow axial space or perforated tube therein, the filtered water flows out of the filter at either at the bottom end or the top end of the filter, depending upon how the internals and ports have been designed.

These tubular filters have a single outside diameter "OD" (the outer cylindrical wall) and a single inside diameter "ID" (the inner cylindrical wall), with the two diameters defining a wall thickness. The cylindrical volume, minus the hollow space volume, defines the volume of filtering media. These tubular shapes have end surfaces opposing each other axially. These end surfaces are typically sealed to end caps to cause fluid to flow in a radial direction rather than around the end surfaces of the block. The ID, OD, and axial length define the surface areas, volume, and mass of the tubular-shaped activated carbon block. Activated carbon blocks can be varied in outside diameter, inside diameter, and length in order to achieve a specified volume and surface area of media.

The materials used to make radial-flow activated carbon blocks, as shown in the above-referenced patents and as discussed above, are typically carbon particles ranging from 12×30 US mesh to 80×325 US mesh (Koslow states 0.1 to 3,000 micrometers) and thermoplastic or thermo-set binders that are common to the art and disclosed in the referenced patents. Other materials can be blended with the carbon particles and binder particles such as lead-reducing sorbents.

Particle size, wall thickness, surface area, and compression can all be adjusted separately to achieve a desired pressure drop through a filter. Use of smaller carbon particles, increased compression, or thicker walls will generally increase pressure drop and increase contaminant removal. Use of larger carbon particles, less compression, or thinner walls will generally decrease pressure drop and decrease contaminant removal. Larger diameters (OD and ID) for cylindrical blocks will decrease pressure drop by increasing surface area available to the fluid. A large OD carbon block with a small ID will have more pressure drop than the same carbon block with a larger inside ID, as the length of the fluid path through the block is longer.

Corrugated Filter Sheets for Air Filtration

Clapham, in U.S. Pat. No. 3,721,072, produces a low-pressure air filter by providing a monolithic extended surface filter sheet, in the form of a wave pattern. Each wave of the extended surface consists of a peak and a trough extending along the entire length of the filter body to the outside boundary of the filter. ('072 FIG. 1). Clapham's wave forms are much smaller than the overall dimensions of the filter body, for example, thirteen waves in a single filter body, and the filter body is substantially wider and longer than it is thick, for example, typically more than 10 times as long (or at least more than 5 times as long) and also more than 10 times as wide (or at least more than 5 times as wide) as the thickness of the filter body. Therefore, the filter body may be considered a corrugated filter sheet or plate. Clapham's sheet-like or platelike filter body may be placed in a frame, extending around the periphery of the filter body, made of "metal, glass, wood, plastic, paperboard, and the like . . . or bonded carbon integral to the filter."

Chapman, in U.S. Pat. Nos. 6,322,615 and 6,056,809, discloses corrugated sheets for air filtration, wherein, as in Clapham, the peaks and troughs extend all the way to the outside boundary of the filter, the wave forms are much smaller than the overall dimensions of the filter body, and the filter body may be considered a corrugated sheet or plate. Methods of making this corrugated filter body comprise rolling the filter material between rollers with multiple V-shaped tools forming the peaks and troughs in the extended surface of the filter body.

Gelderland, et al., in U.S. Pat. No. 6,413,303, disclose activated carbon air filters made of layers of corrugated paper sheets coated in carbon and binder. Insley, et al., in U.S. Pat. No. 6,280,824, disclose polymeric film layers comprising filtration media and each having a corrugated shape. Gelderland, et al. and Insley, et al. each teach flow being through the open spaces defined by the corrugates (parallel to the corrugate troughs), rather than through the corrugated plates (i.e. parallel, rather than transverse, to the plane of each plate).

Granular Activated Carbon Media for Water Filtration

Granular activated carbon (GAC), without binder and with or without various additives such as lead sorbent, has been used in water filtration for years. The granular activated carbon is typically loaded into a compartment inside a filter housing to act as a filter or carbon "bed." The housing and internals are adapted to contain the otherwise-loose granules in place in the compartment, and to distribute water to the inlet of the bed and collect the water at the outlet of the bed. A bed of GAC, with optional other granular media or additives, is the media of choice for low pressure or gravity flow applications, because of the relatively low pressure drop through the bed of granules; no binder is present and, hence, no binder fills the spaces between the carbon granules to interfere with the flow. The interstitial spaces between the granules allow water flow through the bed with good media contact but without the pressure drop that might be expected in a compressed, binder-formed block.

These gravity-flow filtration devices typically feature relatively small, disposable and replaceable filter cartridges that are inserted into the device and used for several weeks of normal use. Examples of these devices and/or of filters that are designed for these devices are disclosed in U.S. Design Pat. No. 416,163, U.S. Design Pat. No. 398,184, U.S. Pat. No. 5,873,995, U.S. Pat. No. 6,638,426, and U.S. Pat. No. 6,290,646. The filters for these devices are entirely or substantially comprised of beds of granular media.

The filtration cartridge typically employed in pour-through (or gravity flow) systems hold blended media of approximately 20×50 mesh granular activated carbon and either an ion exchange resin, which most typically contains a weak acid cation exchange resin, or a natural or artificial zeolite that facilitates the removal of certain heavy metals, such as lead and copper. Weak acid cation exchange resins can reduce the hardness of the water slightly, and some disadvantages are also associated with their use: first, they require a long contact time to work properly, which limits the flow rate to about one-third liter per minute; second, they take up a large amount of space inside the filter (65% of the total volume) and thus limit the space available for activated carbon.

A further problem associated with blended media of granular carbon and ion exchange resin is that they have limited contaminant removal capability due to particle size and packing geometry of the granules. When large granules are packed together, large voids can form between the granules. As water passes through the packed filter bed, it flows through the voids. Much of the water in the voids does not come into direct contact with a granule surface where contaminants can be adsorbed. Contaminant molecules must diffuse through the water in the voids to granule surfaces in order to be removed from the water. Thus, the larger the voids, the larger the contaminant diffusion distances. In order to allow contaminants to diffuse over relatively long distances, long contact time is required for large granular media to remove a significant amount of contaminant molecules from the water.

Conversely, small granules (i.e., 100-150 μm) form small voids when packed together, and contaminants in water within the voids have small distances over which to diffuse in order to be adsorbed on a granule surface. As a result, shorter contact time between the water and the filter media is required to remove the same amount of contaminant molecules from the water for filter media with small granules than for filter media with large granules.

But there are some drawbacks to using filter media with small granules. Water flow can be slow because the packing of the granules can be very dense, resulting in long filtration times. Also, small granules can be more difficult to retain within the filter cartridge housing.

Good flow distribution in the filter is of primary concern in low pressure or gravity flow systems such as in water pitcher devices, water cooler devices, and other systems mentioned above, because flow distribution affects filtration effectiveness and the time at which "breakthrough" of contaminates occurs, and, hence, the time at which the filter should be changed out. As these filtration systems typically do not contain any means for monitoring filtration effectiveness or breakthrough, and, at most, have means for measuring total water that has passed through the filter, it is important that good flow distribution be maintained to maximize use of media, and, hence, to maximize the filtration effectiveness for a given volume of filtered water. If channeling occurs at any time during the filter life, the effectiveness of the filter and/or the effective filter capacity is reduced, and the filtered water quality may drop if the filter is not changed out.

Good water flow rate through the filter is also of primary concern in low pressure or gravity flow water systems such as a water pitcher device, water cooler device, or the like because this affects how quickly filtered water from a freshly-water-filled device may be used. Typically, these devices are kept in the refrigerator or on a countertop, and so their total volume is kept at an amount that is reasonable for such spaces and that is of a reasonable weight to carry. Users of such devices typically do not want to wait a long time for the filtered water. Therefore, reasonable flow rate through the filter is important for customer satisfaction and to gain a competitive edge in the marketplace. As these water filtration devices typically utilize only gravity to force the water through the filters, achieving adequate flowrate of water through the filter is problematic, especially in view of the goal of effective contaminant removal and long filter life. The goal of low pressure drop for high flowrates would drive the design toward short granular filter beds, but the goal of effective contaminant removal and long life without breakthrough would drive the design to in the opposite direction, toward long filter beds. Further, achieving adequate flowrate is also problematic because the carbon-based granular media that are used in the filters in question tend to be slightly hydrophobic. Therefore, while excellent water-media contact is needed for good flow distribution and good flow rates, the media actually tends to resist wetting by the water it is intended to filter.

Therefore, conventional filters for water pitcher devices have typically included GAC beds about 2-6 inches deep. Further, important procedures in the installation of a filter into one of these water pitcher devices are the pre-rinse and the pre-wet steps recommended by manufacturers of the devices and the filters. These procedures involve rinsing the filter and then soaking the fresh filter in water for several minutes prior to inserting the filter into the device. These procedures are explained by the manufacturers as steps that remove carbon fines that may reside in the fresh filter, and that wet the granular or particulate carbon media to achieve better flow distribution and flow rates after the filter is installed in the device.

It is believed that there is room for improvement in the filters used for gravity flow water filtration devices, such as water pitchers, carafes, countertop tanks, and water coolers and other filters that are used for low pressure systems (such as 30 psi or less).

It would be useful to have gravity flow filters that exhibit both good water flow rates and high contaminant reduction.

SUMMARY OF THE INVENTION

A gravity-fed carbon block water filter according to one embodiment of the present invention includes a solid profile filter block comprising multiple sub-blocks, each of the sub-blocks comprising filter media walls surrounding and defining a cavity for receiving fluid, and each of the sub-blocks being connected to at least one other of the sub-blocks by filter media of which the filter block is made. The filter media includes about 20-90 wt % activated carbon particles, and about 5-50 wt % binder material, the binder material being interspersed with the activated carbon particles.

In one approach, the water filter may include about 5-40 wt % of additional active material including a lead scavenger. A preferred lead scavenger is a zirconia oxide or hydroxide. The filter may achieve a Filter Rate and Performance (FRAP) factor of about 350 or less according to the following formula:

$$FRAP = \frac{[V * f * c_e]}{[L * 2]}$$

where:
V=volume of the filter media (cm$^3$),
f=average filtration unit time over lifetime L (min/liter),
$c_e$=effluent lead concentration at end of lifetime L when source water having a pH of 8.5 contains 90-120 ppb (μg/liter) soluble lead and 30-60 ppb (μg/liter) colloidal lead greater than 0.1 μm in diameter, and
L=filter usage lifetime claimed by a manufacturer or seller of the filter (gallons).

In another embodiment, a lead concentration in a final liter of effluent water filtered by the filter is less than about 10 μg/liter after about 151 liters? (40 gallons) of source water filtration, the source water having a pH of 8.5 and containing 135-165 parts per billion total lead with 30-60 parts per billion thereof being colloidal lead greater than 0.1 μm in diameter.

The water filter preferably has an average flow rate of at least 0.1 liter per minute through the filter with a head pressure of between approximately 0.1 and 1.0 psi.

While many types of binder materials may be used, one binder material is hydrophobic. Also, the binder material has a melt index that is less than 1.8 g/10 min as determined by ASTM D 1238 at 190° C. and 15 kg load. In another embodiment, the binder material has a melt index that is less than 1.0 g/10 min as determined by ASTM D 1238 at 190° C. and 15 kg load.

In another embodiment, the structure of the filter block is characterized by having been compressed no less than about 10% by volume during fabrication of the filter.

In yet another embodiment, the water filter fits within a container having a volume of less than about 20 in$^3$. In another embodiment, the filter fits within a container having a volume of less than about 10 in$^3$.

A gravity-fed carbon block water filter according to another embodiment of the present invention includes a solid profile filter block comprising multiple sub-blocks, each of the sub-blocks comprising filter media walls surrounding and defining a cavity for receiving fluid, and each of the sub-blocks being connected to at least one other of the sub-blocks by filter media of which the filter block is made. A lead concentration in a final liter of effluent water filtered by the filter is less than about 10 μg/liter after about 151 liters (40 gallons) of source water filtration, the source water having a pH of 8.5 and containing 135-165 parts per billion total lead with 30-60 parts per billion thereof being colloidal lead greater than 0.1 μm in diameter.

In one approach, the water filter may include about 5-40 wt % of additional active material including a lead scavenger. A preferred lead scavenger is a zirconia oxide or hydroxide. The filter may achieve a Filter Rate and Performance (FRAP) factor of about 350 or less according to the formula above.

The water filter preferably has an average flow rate of at least 0.1 liter per minute through the filter with a head pressure of between approximately 0.1 and 1.0 psi.

While many types of binder materials may be used, one binder material is hydrophobic. Also, the binder material has a melt index that is less than 1.8 g/10 min as determined by ASTM D 1238 at 190° C. and 15 kg load. In another embodiment, the binder material has a melt index that is less than 1.0 g/10 min as determined by ASTM D 1238 at 190° C. and 15 kg load.

In yet another embodiment, the structure of the filter block is characterized by having been compressed no less than about 10% by volume during fabrication of the filter.

In one embodiment, the water filter fits within a container having a volume of less than about 20 in$^3$. In another embodiment, the water filter fits within a container having a volume of less than about 10 in$^3$.

A gravity-fed water filter according to yet another embodiment of the present invention includes filter media including at least activated carbon and a lead scavenger, where the filter achieves a Filter Rate and Performance (FRAP) factor of about 350 or less according to the formula above.

In another embodiment, the filter achieves a FRAP factor of less than about 200.

In some embodiments, the volume of the filter media (V) is less than about 300 cm$^3$. In other embodiments, the volume of the filter media (V) is less than about 150 cm$^3$.

In some embodiments, the average filtration unit time (f) is less than about 12 minutes per liter. In other embodiments, the average filtration unit time (f) is less than about 6 minutes per liter.

In one approach, the filter media is present in the form of a block, which may include a binder material interspersed with particles of the activated carbon. In one embodiment, the binder material has a melt index that is less than 1.8 g/10 min as determined by ASTM D 1238 at 190° C. and 15 kg load. In another embodiment, the binder material has a melt index that is less than 1.0 g/10 min as determined by ASTM D 1238 at 190° C. and 15 kg load.

The block fits within a container having a volume of less than about 20 in³. In another embodiment, the block fits within a container having a volume of less than about 10 in³.

In another embodiment, the block may comprise multiple sub-blocks, each of the sub-blocks comprising filter media walls surrounding and defining a cavity for receiving fluid. The block may have an exterior space, gap, or recess between at least a portion of the multiple sub-blocks. In yet another embodiment, the multiple sub-blocks compromises a filter wall surrounding at least four-sides.

In one approach, the block has an open top for receiving unfiltered water into a cavity thereof.

A median sidewall thickness of the block may be less than about 0.6 inch in some embodiments, and less than about 0.4 inch in others.

A structure of the block may be characterized by having been compressed no more than 10% by volume during fabrication of the filter.

In other embodiments, the filter media comprises primarily particles that are not bound together.

A gravity-flow system for filtering water according to an embodiment includes a container having a source water reservoir than can hold source water and a filtered water reservoir that can hold filtered water; a cartridge in communication with both the source water reservoir and the filtered water reservoir, the cartridge providing a path through which water can flow from the source water reservoir to the filtered water reservoir; and a filter as recited above disposed within the cartridge. In one embodiment, the cartridge has an aperture through a sidewall thereof for allowing at least egress of air into the filtered water reservoir.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, reference should be made to the following detailed description read in conjunction with the accompanying drawings.

FIGS. 10K and L are perspective cross-sectional views of the embodiment of FIGS. 10A-J, taken transverse to the plane separating the two sub-blocks of the filter block. FIG. 10L includes hidden structure in dashed lines.

FIGS. 10M and N are perspective cross-sectional views of the embodiment of FIGS. 10A-L, taken along the plane that separates the two sub-blocks of the filter block. FIG. 10N includes hidden structure in dashed lines.

FIGS. 16A-E are a front view; a perspective, transverse cross-sectional view (transverse to the plane between the sub-blocks); a perspective cross-sectional view (on the plane between the sub-blocks); a bottom view; and a perspective, cross-sectional view taken diagonally through the filter block, respectively, of an alternate embodiment of the invented filter block. These figures portray one embodiment of a brace or partition provided in the filter block external indentation for strengthening/reinforcing the filter block.

DETAILED DESCRIPTION OF THE INVENTION

Figure 1:
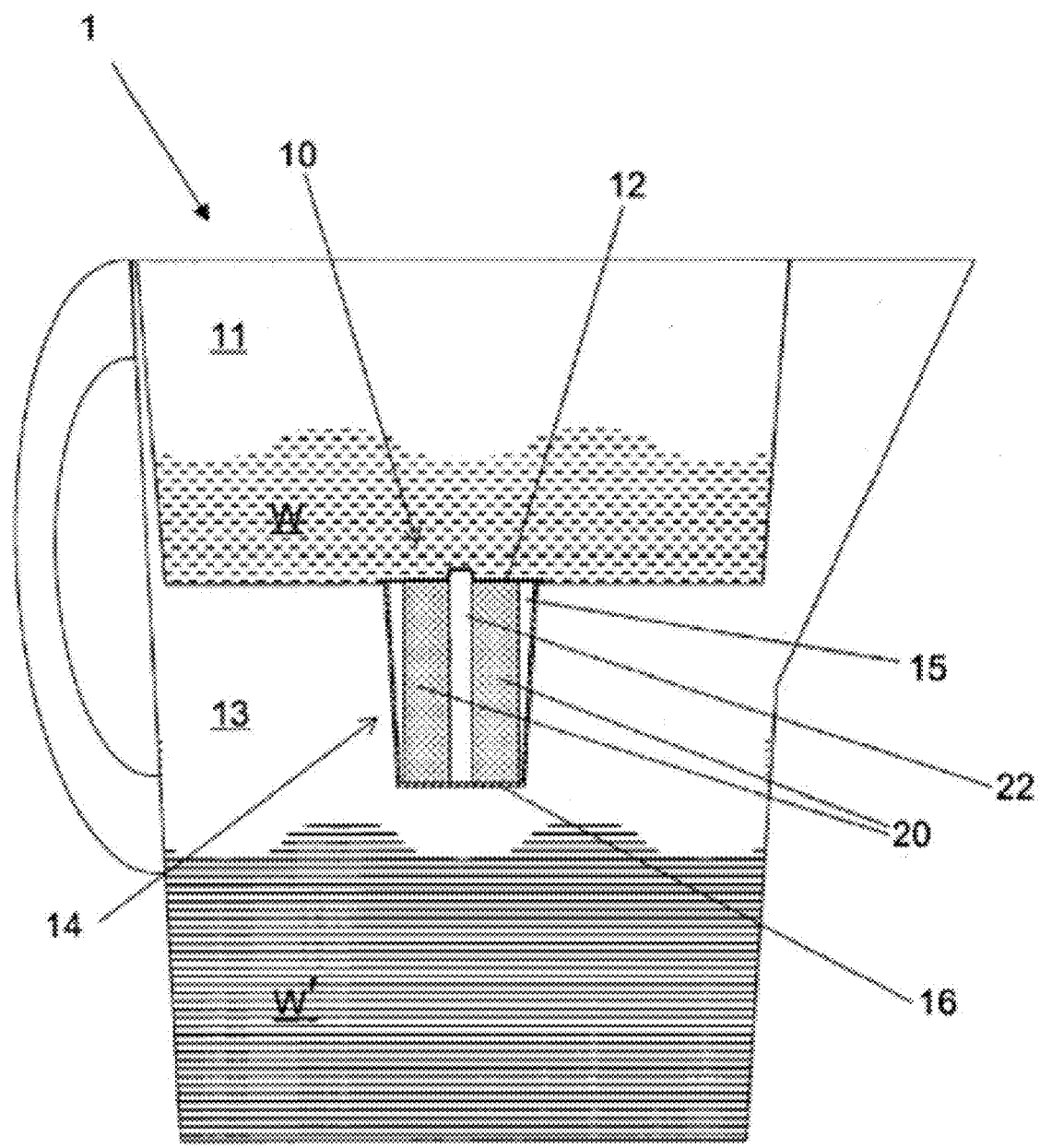
FIG. 1 is a cross-section, side elevation view of a pour-through carafe having a gravity-flow filtration cartridge with a carbon block filter installed therein.

The following description is made for the purpose of illustrating the general principles of the present invention and is not meant to limit the inventive concepts claimed herein.

DEFINITIONS

In describing the embodiments of the present invention, the following terms will be employed, and are intended to be defined as indicated below.

The term "activated carbon," as used herein, means highly porous carbon having a random or amorphous structure, and may have such additional or alternative properties as may be presented or implied from the discussion of activated carbon below.

The term "binder," as used herein, means a material that promotes cohesion of aggregates or particles. Many binders may be used, for example, thermoplastic binder, thermo-set binder, etc. The term "binder" thus includes polymeric and/or thermoplastic materials that are capable of softening and becoming "tacky" at elevated temperatures and hardening when cooled. Such thermoplastic binders include, but are not limited to, end-capped polyacetals, such as poly(oxymethylene) or polyformaldehyde, poly(trichloroacetaldehyde), poly (n-valeraldehyde), poly(acetaldehyde), poly(propionaldehyde), and the like; acrylic polymers, such as polyacrylamide, poly(acrylic acid), poly(methacrylic acid), poly(ethyl acrylate), poly(methyl methacrylate), and the like; fluorocarbon polymers, such as poly(tetrafluoroethylene), perfluorinated ethylene-propylene copolymers, ethylene-tetrafluoroethylene copolymers, poly(chlorotrifluoroethylene), ethylene-chlorotrifluoroethylene copolymers, poly(vinylidene fluoride), poly(vinyl fluoride), and the like; polyamides, such as poly(6-aminocaproic acid) or poly(ε-caprolactam), poly (hexamethylene adipamide), poly(hexamethylene sebacamide), poly(11-aminoundecanoic acid), and the like; polyaramides, such as poly(imino-1,3-phenyleneiminoisophthaloyl) or poly(m-phenylene isophthalamide), and the like; parylenes, such as poly-p-xylylene, poly(chloro-p-xylylene), and the like; polyarylene oxides; polyarylates; polyaryl ethers, such as poly(oxy-2,6-dimethyl-1,4-phenylene) or poly(p-phenylene oxide), and the like; polysulfones; polyaryl sulfones, such as poly(oxy-1,4-phenylenesulfonyl-1,4-phenyleneoxy-1,4-phenylene-isopropylidene-1,4-phenylene), poly-(sulfonyl-1,4-phenyleneoxy-1,4-phenylenesulfonyl-4,4'-biphenylene), and the like; polycarbonates, such as poly (bisphenol A) or poly(carbonyldioxy-1,4-phenyleneisopropylidene-1,4-phenylene), and the like; polyesters, such as poly(ethylene terephthalate), poly(tetramethylene terephthalate), poly(cyclohexylene-1,4-dimethylene terephthalate) or poly(oxymethylene-1,4-cyclohexylenemethyleneoxy-terephthaloyl), and the like; polyaryl sulfides, such as poly(p-phenylene sulfide) or poly(thio-1,4-phenylene), and the like; polyimides, such as poly(pyromellitimido-1,4-phenylene), and the like; polyolefins, such as polyethylene, polypropylene, poly(1-butene), poly(2-butene), poly(1-pentene), poly (2-pentene), poly(3-methyl-1-pentene), poly(4-methyl-1-pentene), and the like; vinyl polymers, such as poly(vinyl acetate), poly(vinylidene chloride), poly(vinyl chloride), polyvinyl halides, polyvinyl esters, polyvinyl ethers, polyvinyl sulfates, polyvinyl phosphates, polyvinyl amines and the like; diene polymers, such as 1,2-poly-1,3-butadiene, 1,4-poly-1,3-butadiene, polyisoprene, polychloroprene, and the like; polystyrenes; copolymers of the foregoing, such as acrylonitrile-butadiene-styrene (ABS) copolymers, and the like; polyoxidiazoles; polytriazols; polycarbodiimides; phenol-formaldehyde resins; melamine-formaldehyde resins; formaldehydeureas; and the like; co-polymers and block interpolymers thereof; and derivatives and combinations thereof.

The thermoplastic binders further include ethylenevinyl acetate copolymers (EVA), ultra-high molecular weight polyethylene (UHMWPE), very high molecular weight polyethylene (VHMWPE), nylon, polyethers such as polyethersulfone, ethylene-acrylic acid copolymer, ethylene-methacrylic acid copolymer, ethylene-methylacrylate copolymer, polymethylmethacrylate, polyethylmethacrylate, polybutylmethacrylate, and copolymers/mixtures thereof.

The term "low melt index polymeric material," as used herein, means a polymeric material having a melt index less than 1.8 g/10 min., as determined by ASTM D 1238 at 190° C. and 15 kg load. The term thus includes both ultra high and very high molecular weight polyethylene.

The term "colloidal lead" or "particulate lead" as used herein, means lead aggregates or compounds having a size greater than 0.1 μm in diameter. The term "soluble lead" as used herein means lead in ionic form or lead in aggregates or compounds smaller than 0.1 μm in diameter.

The term "incorporating," as used herein, means including, such as including a functional element of a device, apparatus or system. Incorporation in a device may be permanent, such as a non-removable filter cartridge in a disposable water filtration device, or temporary, such as a replaceable filter cartridge in a permanent or semi-permanent water filtration device.

Filter performance can be defined in various ways. For the purposes of the instant invention, good filter performance means some or all of the following:

Removal of at least 99.95% of particles greater than 3 μm in size from the source water until the water flow rate has been reduced by approximately 75% from an initial water flow rate;

Reduction of lead concentration to no more than 15 ppb in 80 gallons of source water that has an initial lead concentration of 150 ppb;

Reduction of colloidal lead from a solution containing 45 ppb of colloidal lead and 105 ppb of soluble lead. The effluent concentration of all forms of lead is reduced to less than 15 ppb.

Reduction of chloroform concentration to no more than 80 ppb in 80 gallons of source water that has an initial chloroform concentration of 450 ppb.

Reduction for all challenges is evaluated by measuring the given contaminant concentration in the effluent water collected throughout the testing lifetime of the filter at defined intervals, including but not limited to the initial effluent after filter conditioning, 50%, 100%, 180%, 200% of the claimed filter lifetime.

In general, water moves through gravity flow water filters with head pressures less than 1 pound per square inch (psi). Good flow rates for gravity flow water filters with head pressures in this range are rates faster than about 0.010 liters/min (or about 0.026 gallons/min), and preferably faster than about 0.20 liters/min (or about 0.05 gallons/min). In general, conventional, loose media, gravity-flow carbon filters have flow rates between about 0.125 liters/minute and 0.250 liters/minute. Heretofore known conventional carbon block filters vary in their flow rate performance and, as they are usually used only in faucet-mount systems, are subject to wider ranges of head pressure due to variations in household water pressures than are loose media filters. Typical carbon block filters can have flow rates around 3.5 liters/min (or about 0.75 gallons/min) with head pressures around 60 psi. In general, flow rates of water through most block filters under the low pressure (less than 1 psi) conditions found in gravity flow systems is unacceptably slow.

As will be appreciated by one having ordinary skill in the art, the gravity flow filters described herein have many advantages.

In one embodiment of the invention, a gravity-fed carbon block water filter, described in detail below, generally includes a solid profile filter block comprising multiple sub-blocks, each of the sub-blocks comprising filter media walls surrounding and defining a cavity for receiving fluid, and each of the sub-blocks being connected to at least one other of the sub-blocks by filter media of which the filter block is made. The filter media includes about 20-90 wt % activated carbon particles and about 5-50 wt % binder material, the binder material being interspersed with the activated carbon particles.

In another embodiment of the invention, a gravity-fed carbon block water filter includes a solid profile filter block comprising multiple sub-blocks, each of the sub-blocks comprising filter media walls surrounding and defining, on at least four sides, a cavity for receiving fluid, and each of the sub-blocks being connected to at least one other of the sub-blocks by filter media of which the filter block is made. A total lead concentration (colloidal and soluble) in a liter of effluent water filtered by the carbon block is less than about 10 μg/liter throughout approximately 151 liters (40 gallons) of source water filtration, the source water having a pH of 8.5 and containing 135-165 parts per billion (ppb) total lead with 30-60 ppb thereof being colloidal lead greater than 0.1 μm in diameter.

In yet another embodiment a gravity-fed carbon block water filter includes activated carbon particles, a binder material interspersed with the activated carbon particles, and a lead scavenger coupled to at least one of the activated carbon particles and binder material, the lead scavenger being for removing lead from water. The filter fits within a container having a volume of less than about 20 in³. A total lead concentration (colloidal and soluble) in a liter of effluent water filtered by the carbon block is less than about 10 μg/liter throughout approximately 151 liters (40 gallons) of source water filtration, the source water having a pH of 8.5 and containing 135-165 parts per billion total lead with 30-60 ppb thereof being colloidal lead greater than 0.1 μm in diameter. The water has an average flow rate of at least 0.1 liter per minute through the filter with a head pressure of between approximately 0.1 and 1.0 psi.

In a further embodiment of the present invention, a gravity-fed water filter (block or granular) includes filter media including at least activated carbon and a lead scavenger. The filter achieves a Filter Rate and Performance (FRAP) factor of about 350 or less according to the following formula:

$$FRAP = \frac{[V*f*c_e]}{[L*2]}$$

where:
V=volume of the filter media (cm³),
f=average filtration unit time over lifetime L (min/liter),
$c_e$=effluent lead concentration at end of lifetime L when source water having a pH of 8.5 contains 90-120 ppb (μg/liter) soluble lead and 30-60 ppb (μg/liter) colloidal lead greater than 0.1 μm in diameter
L=filter usage lifetime claimed by a manufacturer or seller of the filter (gallons).

In yet another embodiment, a gravity-fed carbon block water filter includes activated carbon particles, and a binder material interspersed with the activated carbon particles, wherein the binder material has a melt index that is less than 1.8 g/10 min at 190° C. and 15 kg load. In yet another embodiment, the binder material has a melt index that is less than 1.0 g/10 min at 190° C. and 15 kg load. A structure of the block is characterized by having been compressed less than about 10% by volume during fabrication of the filter. Water passing through the filter has an average flow rate of at least 0.1 liter per minute through the filter with a head pressure of between approximately 0.1 and 1.0 psi.

As alluded to, the aforementioned filters may be implemented in a low pressure or gravity-flow system for filtering water. In general, a gravity-flow system for filtering water may include a container having a source water reservoir that can hold source water and a filtered water reservoir that can hold filtered water; a cartridge in communication with both the source water reservoir and the filtered water reservoir, the cartridge providing a path through which water can flow from the source water reservoir to the filtered water reservoir; and a carbon block filter as recited above disposed within the cartridge. An illustrative gravity-flow system for filtering water is shown in FIG. 1.

Referring to FIG. 1, there is shown a filter cartridge 10 installed in a pour-through water carafe 1. The filter cartridge 10 has a carbon block filter 20 inside. In operation, source water W flowing from upper reservoir 11 to lower reservoir 13 is channeled through a plurality of openings (not shown) in cover 12, directly into interior space 15 of filter cup 14. Inorganic and organic contaminants are removed from the source water W, as the source water W moves through the filter 20, thus transforming the source water W into filtered water W'. The filtered water W' flows into cavity 22 of the filter 20 and out through bottom 16 of the filter cup 14 into lower reservoir 13.

In an alternate embodiment, source water W flowing from the upper reservoir 11 to the lower reservoir 13 is channeled through a plurality of openings (not shown) in the cover 12, directly into the filter cavity 22. Inorganic and organic contaminants are removed from the source water W, as the source water W moves through the filter 20, thus transforming the source water W into filtered water W'. The filtered water W' flows from the filter 20 directly out through the bottom 16 of the filter cup 14 and into the lower reservoir 13.

Although a pour-through carafe has been used to illustrate the filter 20, the filter 20 can be employed in combination with any water pitcher, bottle, carafe, tank, water cooler or other gravity-flow filtration system. The embodiments of the invention should thus not be construed as being limited in scope to filtering water only in pour-through carafes.

Further, multiple filters may be present in a single device, such as the aforementioned water pitcher, bottle, carafe, tank, water cooler or other gravity-flow filtration system. The filters may have the same construction, shape, and/or properties; or may be different. The filters may be arranged for concurrent flow (e.g., to increase filtering speed), and/or may filter the fluid in stages (e.g., one filter acts as a prefilter). Advantages of embodiments having two filters include increased flow rates, decreased frequency of filter changes, etc.

The filter 20 can contain activated carbon that is bonded with a binder to form an integrated, porous, composite, carbon block. The activated carbon can be in the form of particles or fibers. In some embodiments, the filter 20 includes at least one additional active material, such as ceramic or zeolite particles. The active material(s) can also be bound together with the carbon and the binder within the porous composite block.

Several potential filter materials are described below. While the discussion will tend to focus on block filters, it should be understood that the various materials may be used in granular or "loose media" type filters, according to various embodiments of the present invention.

Activated Carbon

Activated carbon from any source can be used, such as that derived from bituminous coal or other forms of coal, or from pitch, bones, nut shells, coconut shells, corn husks, polyacrylonitrile (PAN) polymers, charred cellulosic fibers or materials, wood, and the like.

Activated carbon granules can, for example, be formed directly by activation of coal or other materials, or by grinding carbonaceous material to a fine powder, agglomerating it with pitch or other adhesives, and then converting the agglomerate to activated carbon. Different types of activated carbon can be used in combination or separately, e.g., 90% coconut carbon and 10% bituminous carbon.

In one embodiment of the invention, the mesh size of the activated carbon is approximately 80×325 U.S. mesh. Illustrative carbon particle size distributions are as follows:

80×325 Activated Carbon (d(0.1)=18.6 um, d(0.5)=87.1 um, d(0.9)=191.3 um)

80×325 Activated Carbon (d(0.1)=15.5 um, d(0.5)=73.8 um, d(0.9)=154.3 um)

In another embodiment of the invention, the mesh size of the activated carbon is approximately 80×200 U.S. mesh.

In yet another embodiment of the invention, the mesh size of the activated carbon is approximately 50×200 U.S. mesh.

In some arrangements, the activated carbon has an average particle size such that it can pass through a screen of 350 mesh or less (e.g., an average particle size of less than about 350 mesh-about 40 μm). In one arrangement, the activated carbon has a mean particle size in the range of 70-220 μm. In another arrangement, the activated carbon has a mean particle size in the range of 70-90 μm.

In another embodiment of the invention, the carbon content is in the range of approximately 20-90%, by weight. In an alternative embodiment, the carbon content is in the range of approximately 30-80%, by weight. In yet another embodiment, the carbon content is in the range of approximately 30-50% by weight.

Binder

The binder can contain any of the aforementioned binder materials. The binder can be a low melt index polymeric material, as described above. In other arrangements, the binder can contain a higher melt index material, that is, a material with a melt index that is greater than 1.8 g/10 min as determined by ASTM D 1238 at 190° C. and 15 kg load. Preferred binders are also hydrophobic.

Low melt index polymeric materials having a melt index less than approximately 1.8 g/10 min as determined by ASTM D 1238 at 190° C. and 15 kg load, such as VHMWPE or UHMWPE, are well known in the art. Low melt index binders do not flow easily when heated, but become only tacky enough to bind granules together without covering much of the surface of the granules.

In some arrangements, binder materials that have high melt index values, that is, melt indices greater than those of VHMWPE or UHMWPE, such as poly(ethylene-co-acrylic acid) or low density polyethylene, can also be used. Even though high melt index materials can tend to melt and flow when heated, careful choice of binder particle size and processing conditions can make these materials very effective for forming porous composite blocks for water filtration. These binders and their use in water filtration have been disclosed by Taylor et al. in U.S. patent application Ser. No. 10/756,478, filed Jan. 12, 2004, which is included by reference herein.

As will be appreciated by one having ordinary skill in the art, the type of binder used to construct the filter 20 can affect the initial flow rate of water through the filter, since carbon is more hydrophilic than most binders or other actives. Initially, the filter 20 is dry and when it is placed in contact with water, it may or may not absorb the water readily and thus allow for immediate water flow. Filters made with UHMWPE or VHMWPE with a low melt index tend to absorb water more readily than filters made with EVA or LDPE. Also, by maximizing the available surface area of the carbon, one can achieve a carbon block that is hydrophilic and readily absorbs water. As a result, binders that neither flow nor deform significantly when melted, but simply become tacky, maximize the available carbon surface area and thus maximize the water absorptivity of the carbon block. Other binders that have a tendency to melt during processing can also provide a large available carbon surface area when they have very small particle sizes.

In order to minimize the amount of carbon particle surface area covered/blocked by binder, especially-preferred binders comprise at least one binder having less than or equal to 10 g/min melt index, or, more preferably, 0.1-10 g/min melt index and especially 1-10 g/min melt index by ASTM D1238 or DIN 53735 at 190 degrees C. and 15 kilograms. Binders from these ranges may be selected that become tacky enough to bind the media particles together in a solid profile, but that maintain a high percentage of the media particle surface area uncovered/unblocked and available for effective filtration. Further, binders from these ranges may be selected that leave many interstitial spaces/passages open in the solid profile; in other words, it is desirable to have the binder not completely fill the gaps between media particles. With binders in these ranges, blocks have been made according to embodiments of the invention that have excellent pressure drop. It is believed that this excellent, low pressure drop results from the various block shapes and the porosity and high amount of interstitial spaces and passages through the solid profile. A high amount of porosity is desirable, and, when combined with the high amount of "bulk" surface area for the block (bulk surface area meaning the exposed surfaces of the block, including the cavities described above), the preferred embodiments are effective in delivering fluid to the media of the block, effective in fluid flow through the porous block, and effective in fluid flow out of the media in the block.

In one embodiment, the binder content is in the range of approximately 5-50%, by weight. In another embodiment, the binder content is in the range of approximately 20-45%, by weight. In yet another embodiment, the binder content is in the range of approximately 35-40% by weight.

In one embodiment of the invention, the binder particles are in the range of approximately 5-150 µm. In an alternative embodiment, the binder particles are in the range of approximately 100-150 µm. In another embodiment, the binder particles are approximately 110 µm.

Actives

One or more additional active materials (or actives) can be included in the carbon block filter. The active(s) can contain ceramic particles, zeolite particles, zirconia, aluminosilicate, silica gel, alumina, metal oxides/hydroxides, inert particles, sand, surface charge-modified particles, clay, pyrolyzed ion-exchange resin, silver, zinc and halogen based antimicrobial compounds, acid gas adsorbents, arsenic reduction materials, iodinated resins, and mixtures thereof.

In one embodiment, the actives constitute between about 0.01 wt % and 70 wt % of the porous composite block. In other arrangements, the actives constitute between about 10 wt % and 40 wt % of the porous composite block. In another arrangement, the actives constitute between about 20% and 30%, by weight, of the porous composite block.

In one embodiment of the invention, the actives have a mean particle size in the range of approximately 10 to 100 µm. In another embodiment, the actives have a mean particle size in the range of approximately 20-70 µm. In an alternative embodiment, the actives have a mean particle size in the range of approximately 1 to 50 µm.

Preferred actives include lead scavengers, e.g., lead sorbents, or arsenic removal additives. Illustrative lead scavengers include metal ion exchange zeolite sorbents such as Engelhard's ATS™ and aluminosilicates such as Selecto Scientific's Alusil™. Particularly preferred lead scavengers are zirconia oxides and hydroxides. Lead scavengers may be present in the amounts recited above for actives in general. A preferred range of lead scavenger content is about 5-40% by weight.

Filter Cartridge/Filter Assemblies

Figure 2:
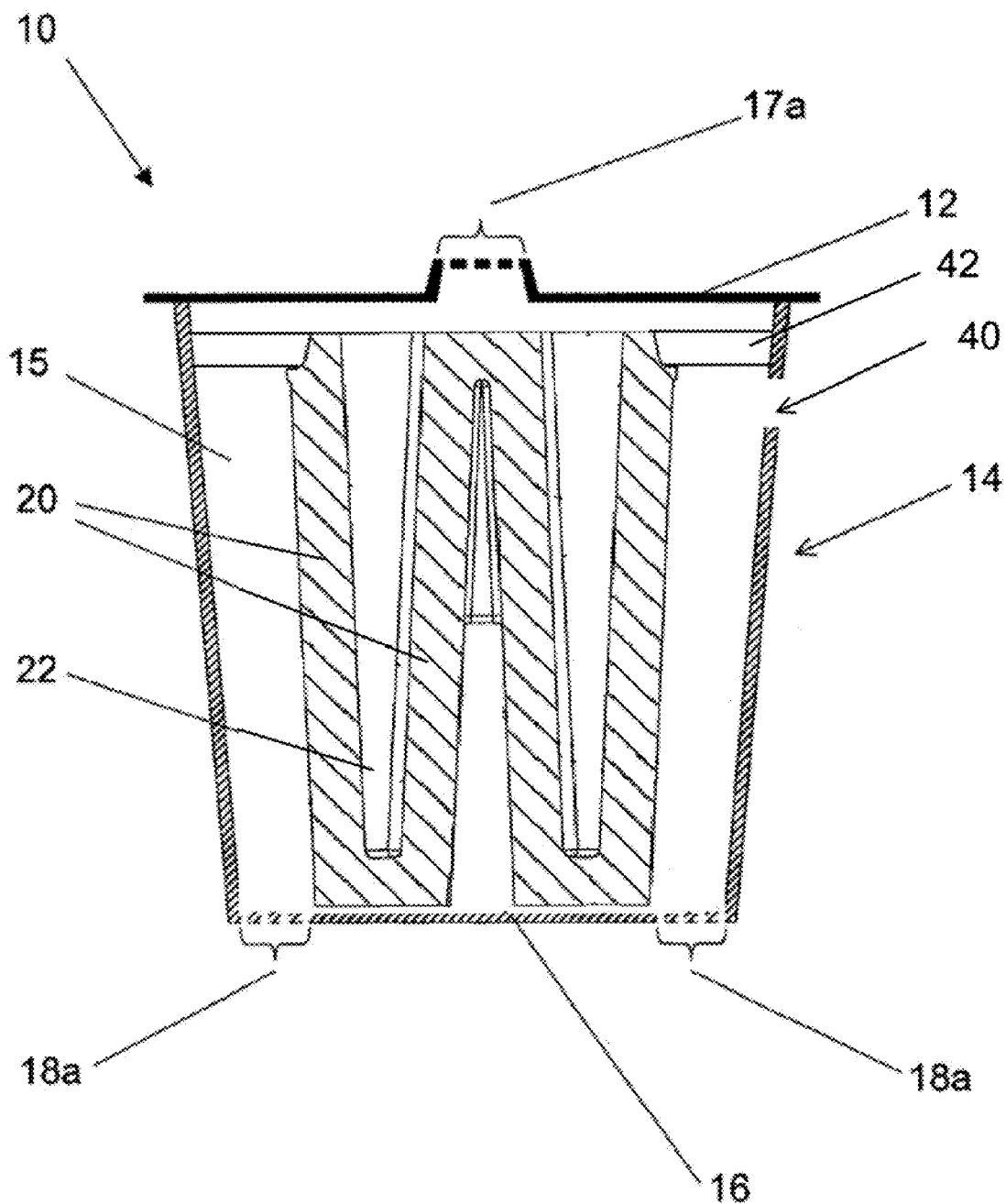
FIG. 2 is a cross-section, side elevation view of an embodiment of a filtration cartridge with a carbon block filter installed therein.

Filter blocks presented herein can be employed in most, if not all, gravity-flow filtration cartridges adapted to receive same. FIG. 2 is a schematic cross section of a filter housing or cartridge 10 that contains a porous composite carbon block filter 20, according to an embodiment of the invention. The cartridge includes a cover 12 and a cup 14. The cover 12 can be attached to the cup 14 after the filter 20 is placed inside the cup 14. Within the interior space of the cartridge 10 there is an outer space 15 outside the porous composite carbon block 20 and an inner space or cavity 22 within the bore of the porous composite carbon block 20. The cover 12 includes a plurality of entrance openings 17a near the center of the cover 12. The entrance openings 17a are adapted to allow water to enter into the inner space 22. The bottom 16 of the cup 14 includes a plurality of exit openings 18a. The exit openings 18a are adapted to allow water to exit from the outer space 15 and/or the porous composite carbon block 20. The cartridge may have an aperture 40 through a sidewall thereof for allowing at least egress of air into the treated water compartment. A flange 42 may also be present to channel the unfiltered water into the cavity 22 of the composite block 20.

Figure 3:
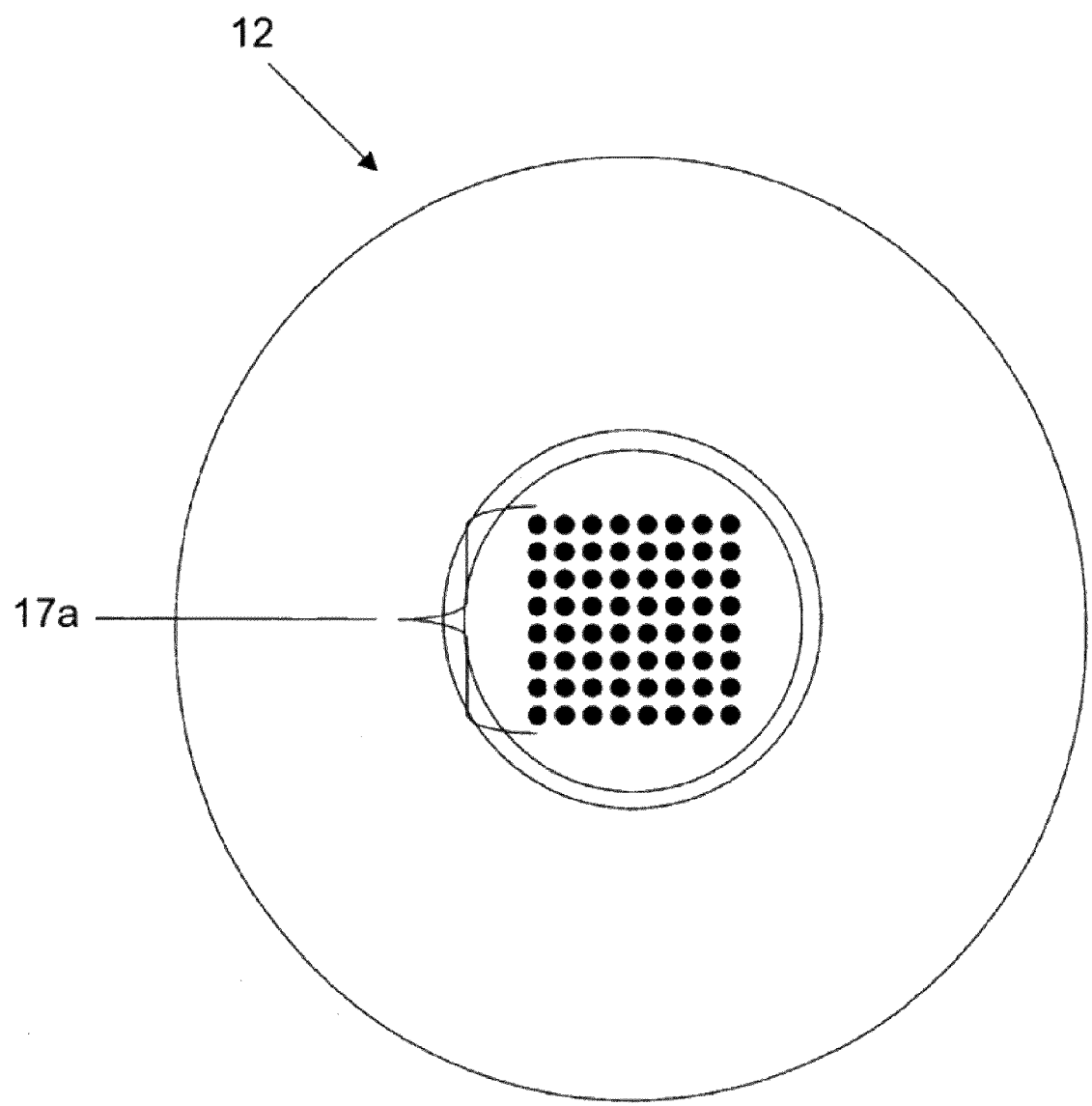
FIG. 3 is a top plan view of the filtration cartridge cover shown in FIG. 2.

FIG. 3 is a top view of the cover 12 of the filter cartridge 10 of FIG. 2, showing an exemplary embodiment of the invention. In this example, the entrance openings 17a are shown grouped near the center of the cover 12. Although the entrance openings 17a are shown as round holes arranged in a square array, it will be appreciated that other opening shapes, such a slots or slits and other arrangements of the openings, can be employed.

Figure 4:
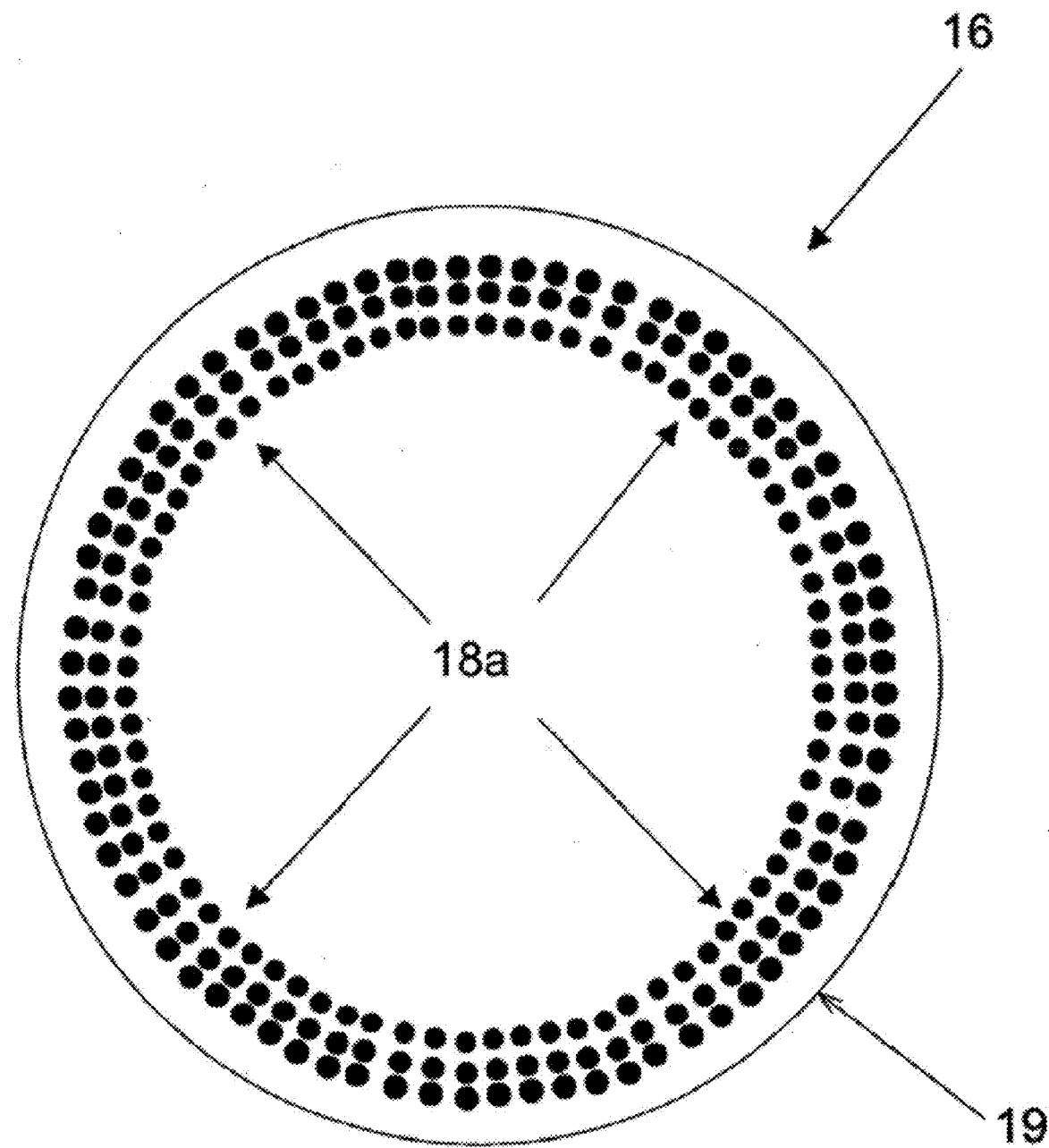
FIG. 4 is a bottom plan view of the filtration cartridge cup shown in FIG. 2.

FIG. 4 is a bottom view of the cup 14 of the filter cartridge 10 of FIG. 2, showing an exemplary embodiment of the invention. In this arrangement, the exit openings are distributed in a circle concentric to an outer edge 19 of the cup bottom 16. Although the exit openings 18a are shown as round holes, it will be appreciated that other shapes, such a slots or slits, can be employed.

Figure 5:
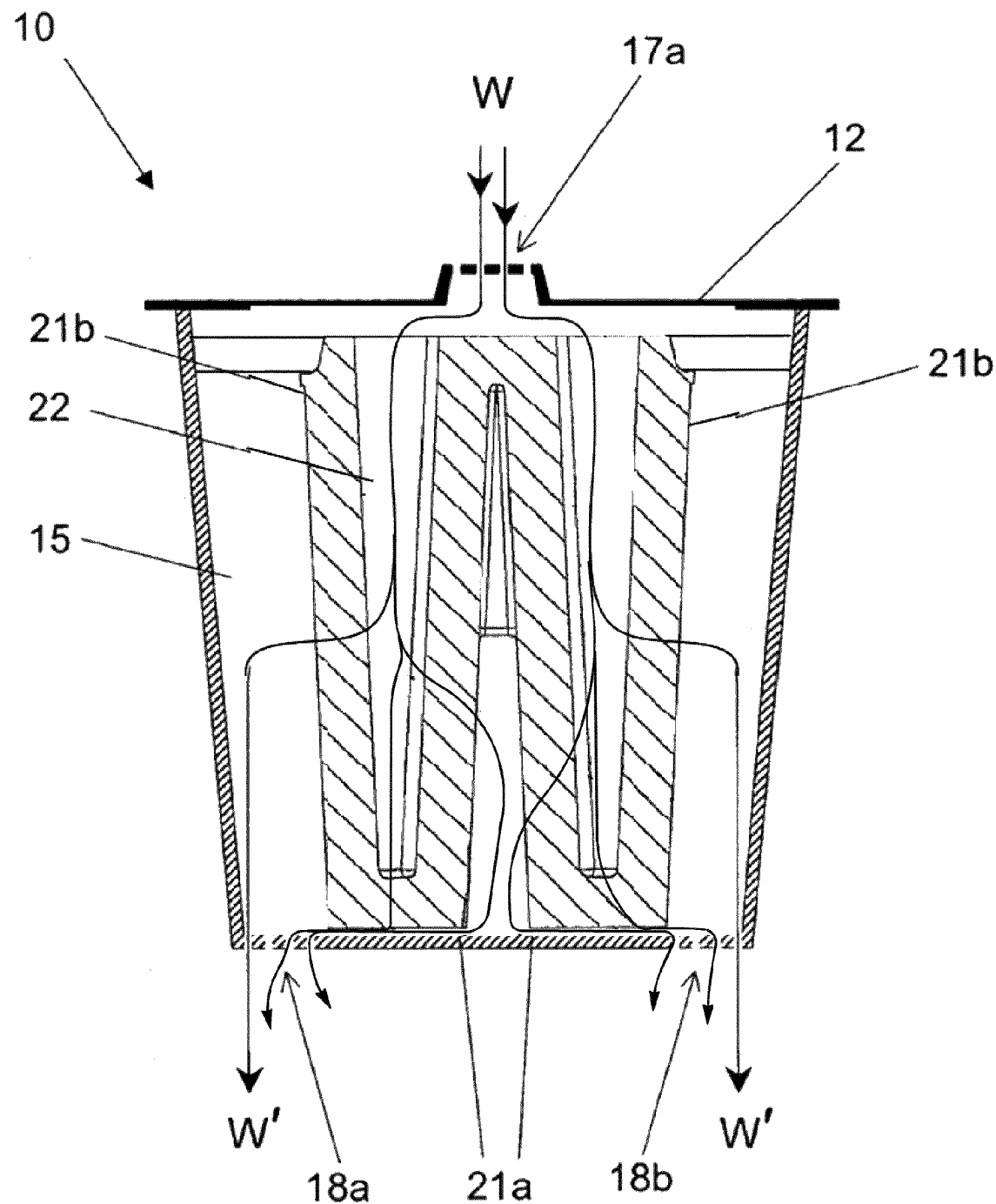
FIG. 5 is a cross-section, side elevation view of an inside-out water flow path through the filtration cartridge assembly shown in FIG. 2.

FIG. 5 is a schematic cross section showing a water flow path through the filter cartridge 10 and the carbon block filter 20. When the cap 12 is exposed to a body or flow of source water W, the source water W flows into and through the entrance openings 17a in the cap 12, and enters into the inner space 22 of the filter 20. The water W then flows through an interior wall 21a of the filter 20, out an exterior wall 21b of the filter 20, and into the outer space 15. In passing through the filter 20, the source water W becomes purified water W'. The purified water W' exits the filter cartridge 10 through the exit openings 18a.

Figure 6:
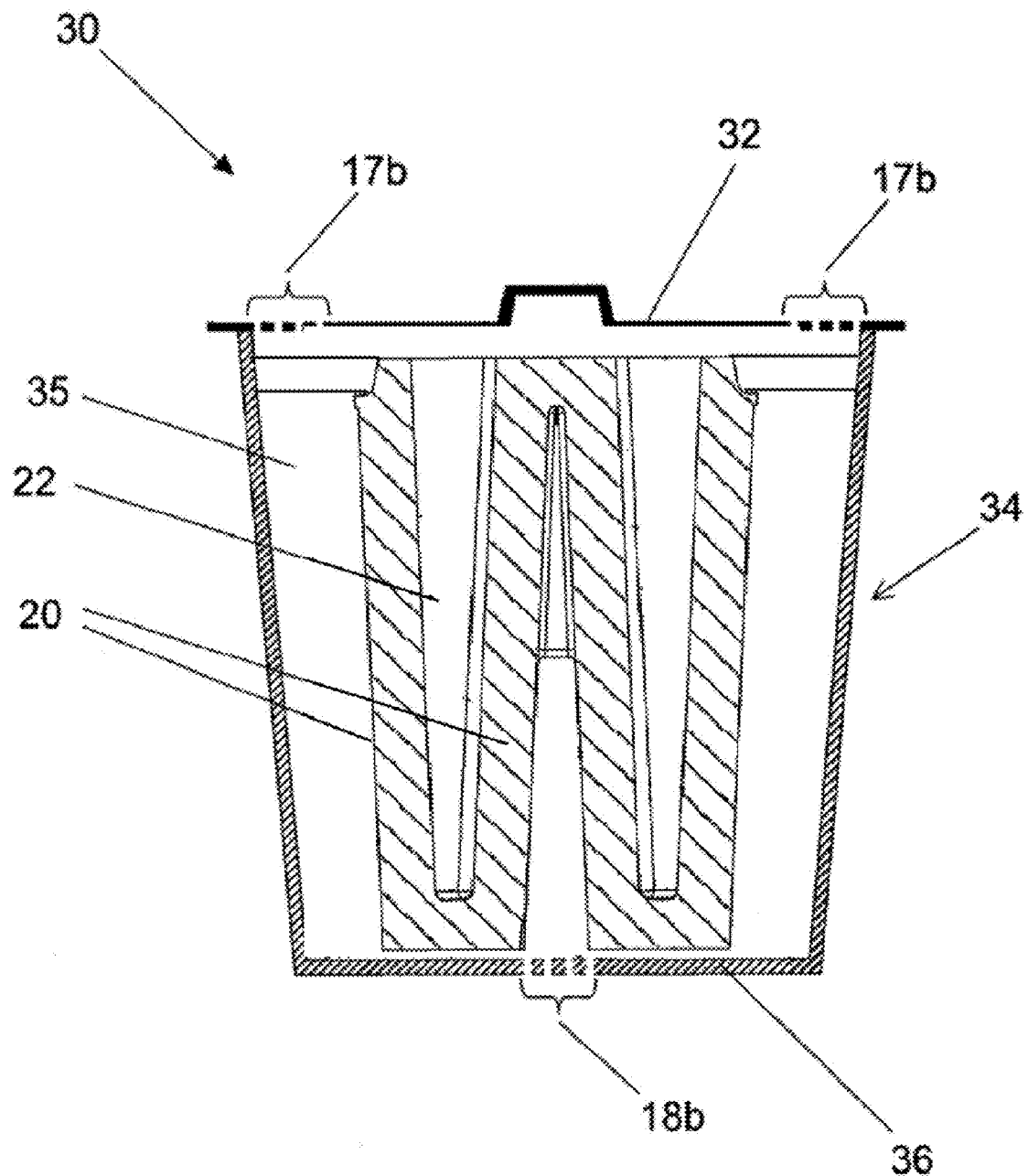
FIG. 6 is a cross-section, side elevation view of an embodiment of a filtration cartridge having a carbon block filter installed therein.

FIG. 6 is a schematic cross section of a filter housing or cartridge 30 that contains a porous composite carbon block filter 20, according to another embodiment of the invention. The cartridge includes a cover 32 and a cup 34. The cover 32 can be attached to the cup 34 after the filter 20 is placed inside the cup 34. Within the interior space of the cartridge 30 there is an outer space 35 outside the porous composite carbon block 20 and an inner space 22 within the bore of the porous composite carbon block 20. The cover 32 includes a plurality of entrance openings 17b near the periphery of the cover 32. The entrance openings 17b are adapted to allow water to enter into the inner space 22. The bottom 36 of the cup 34 includes a plurality of exit openings 18b. The exit openings 18b are adapted to allow water to exit from the outer space 35 and/or the porous composite carbon block 20.

Figure 7:
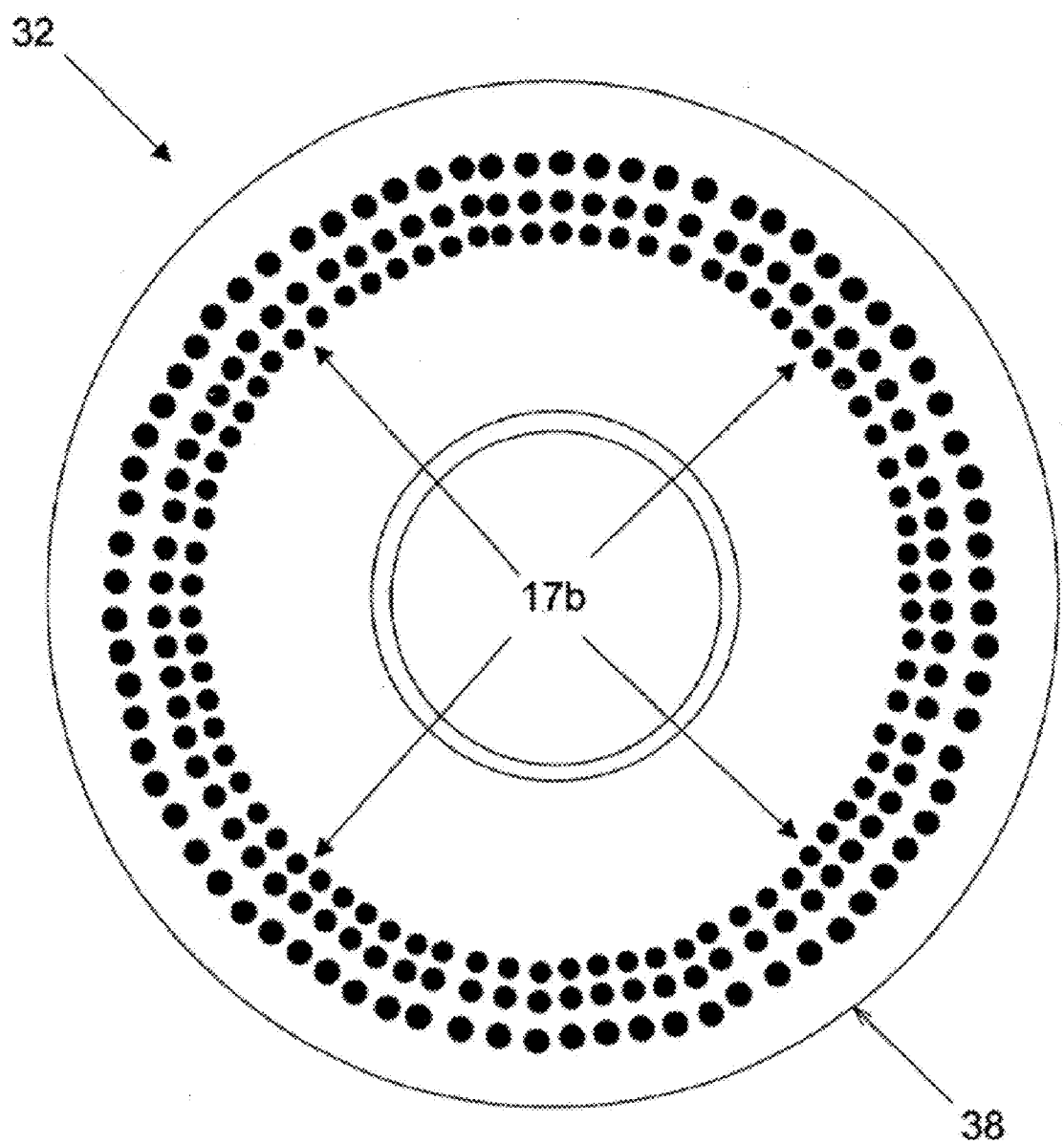
FIG. 7 is a top plan view of the filtration cartridge cover shown in FIG. 6.

FIG. 7 is a top view of the cover 32 of the filter cartridge 30 of FIG. 6, showing an exemplary embodiment of the invention. In this arrangement, the entrance openings are distributed in a circle concentric with an outer edge 38 of the cover 32. Although the entrance openings 17b are shown as round holes arranged in a square array, it will be appreciated that other opening shapes, such a slots or slits and other arrangements of the openings, can be employed.

Figure 8:
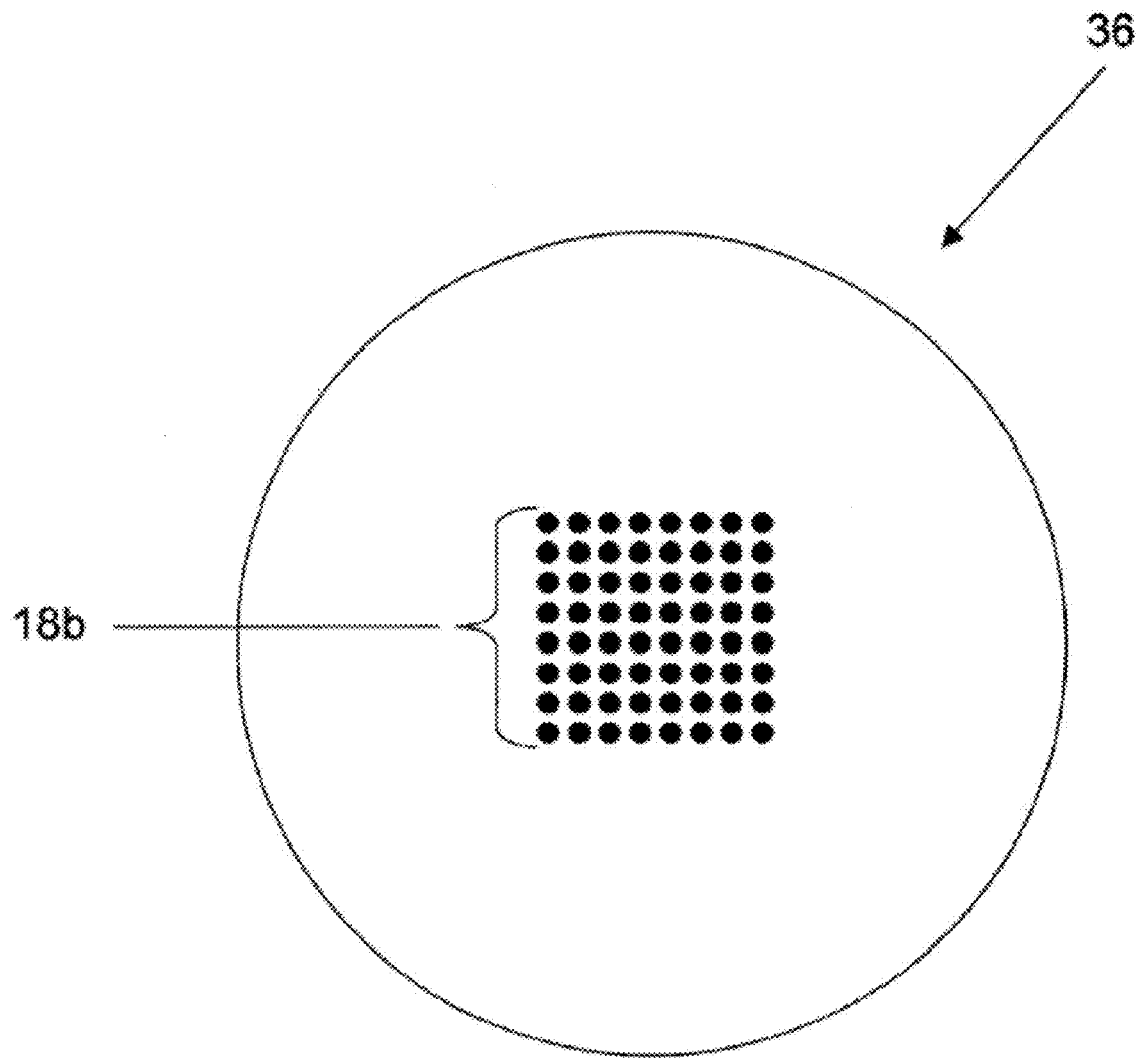
FIG. 8 is a bottom plan view of the filtration cartridge cup shown in FIG. 6.

FIG. 8 is a bottom view of the cup 34 of the filter cartridge 30 of FIG. 6, showing an exemplary embodiment of the invention. In this example, the exit openings 18b are shown grouped near the center of the cup bottom 36. Although the exit openings 18b are shown as round holes, it will be appreciated that other shapes, such a slots or slits, can be employed.

Figure 9:
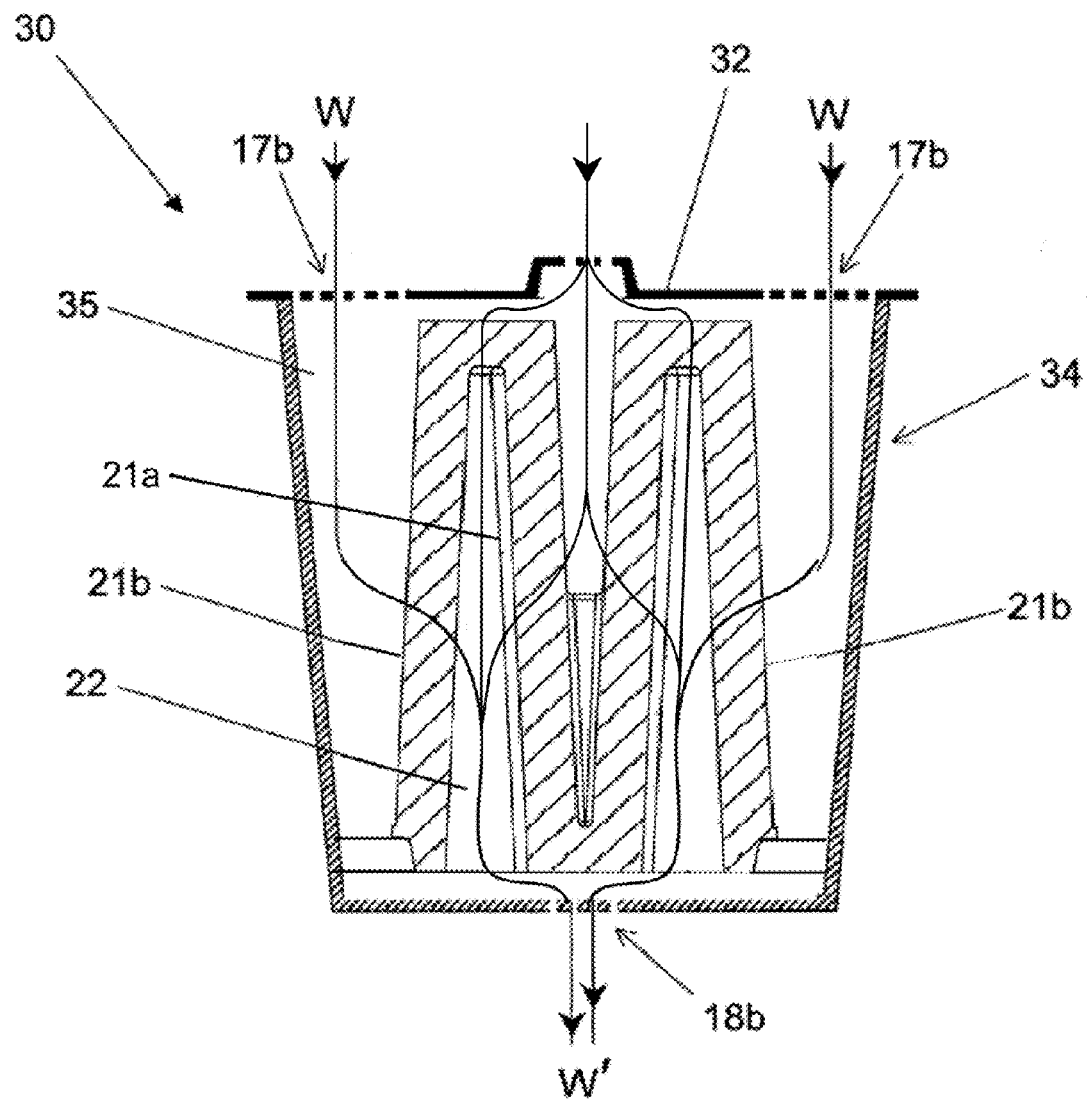
FIG. 9 is a cross-section, side elevation view of an outside-in water flow path through the filtration cartridge shown in FIG. 6.
Figure 10D:
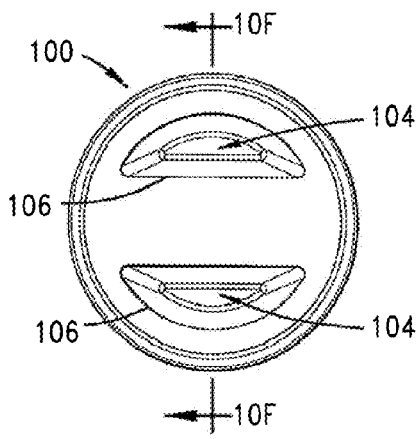
FIGS. 10A-F are a perspective view, a front view, a side view, a top view, a bottom view, and an axial cross-sectional view, respectively, of one embodiment of the invented multi-core block.
Figure 10F:
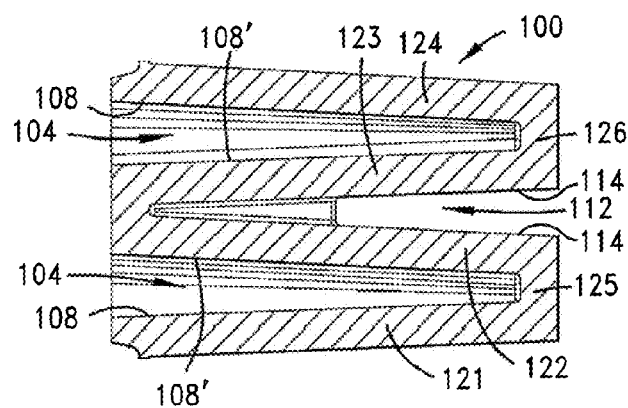
Figure 10B:
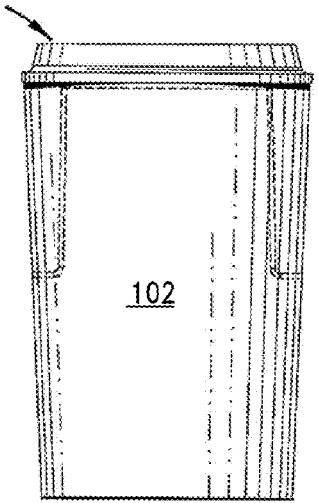
Figure 10C:
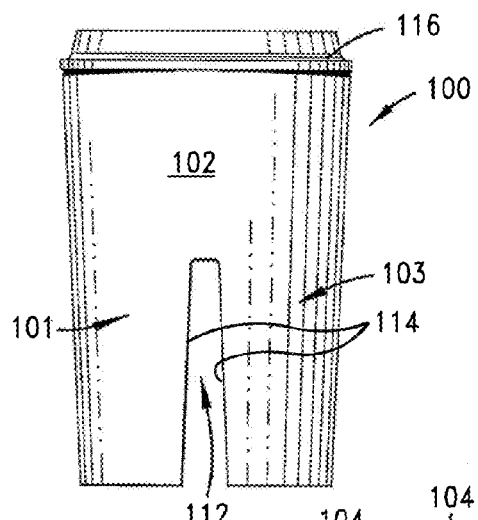
Figure 10E:
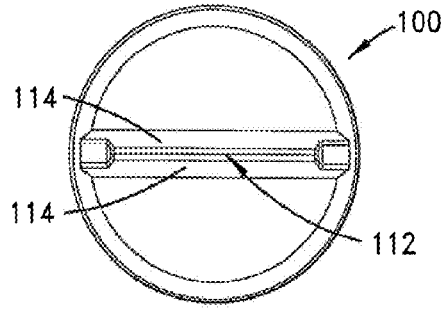
Figure 10A:
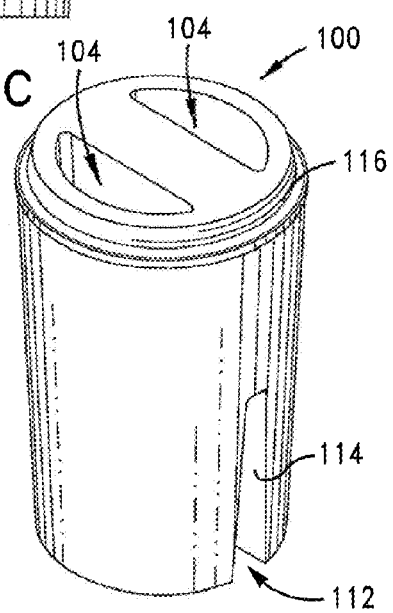
Figure 10G:
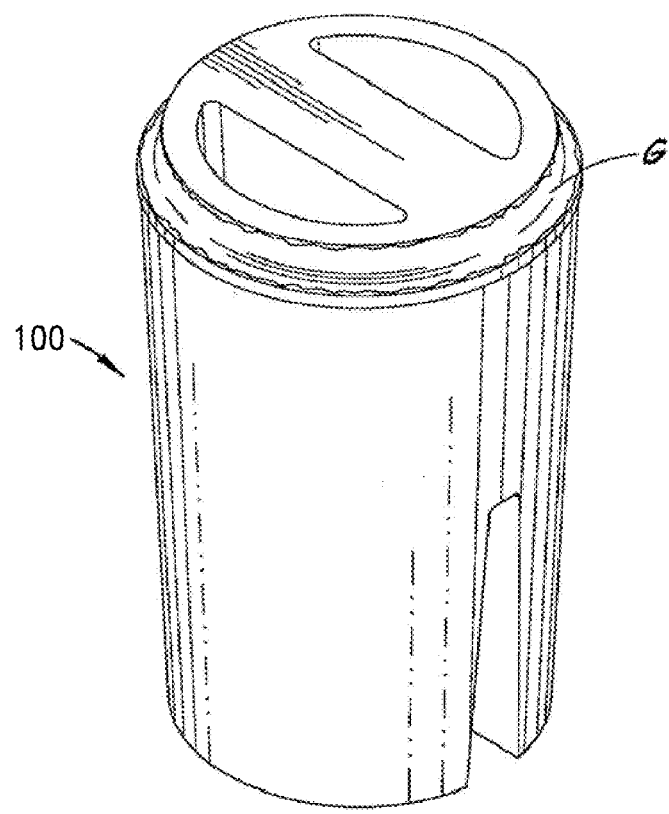
FIG. 10G is a perspective view of the embodiment of FIGS. 10A-F, with a bead/ring of adhesive added for sealing and end of the filter block to a housing structure.
Figure 10H:
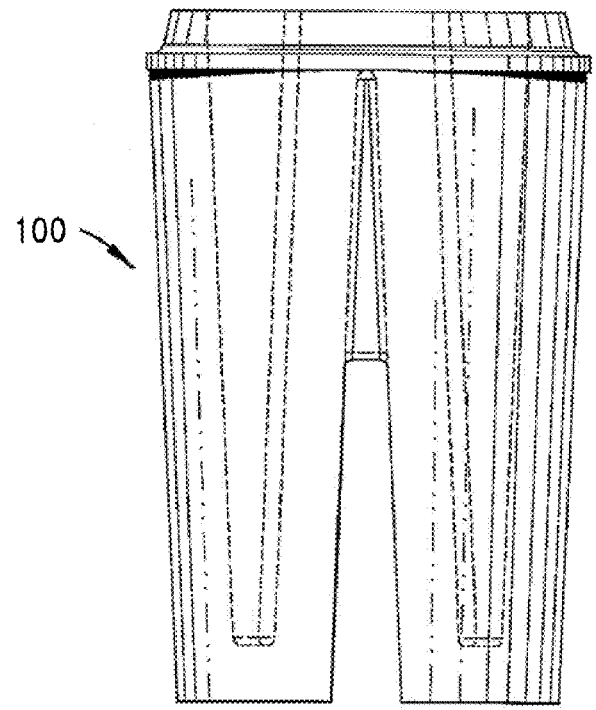
FIGS. 10H-J are a side view, a front view and a perspective view of the embodiment of FIGS. 10A-G, with a hidden structure shown in dashed lines.
Figure 10I:
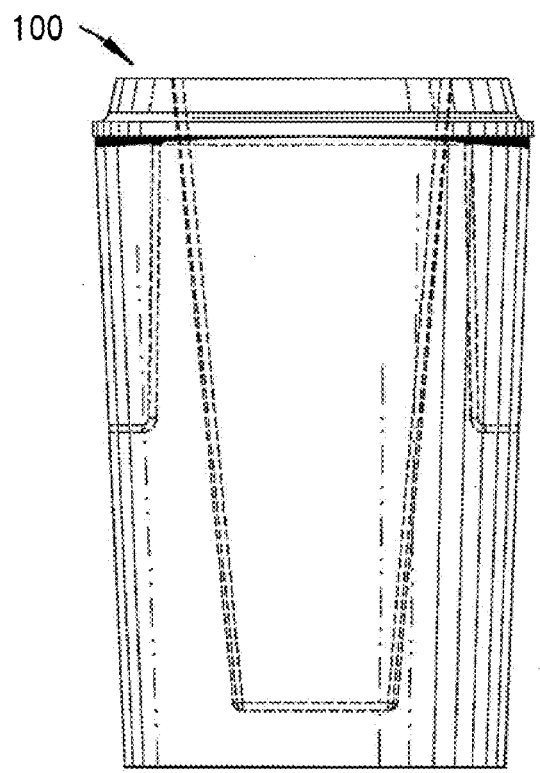
Figure 10J:
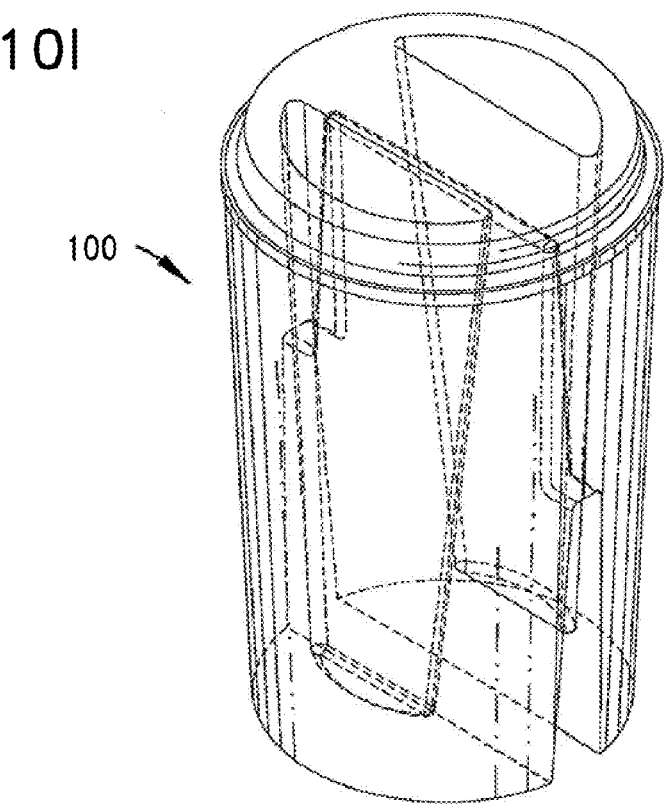
Figure 11D:
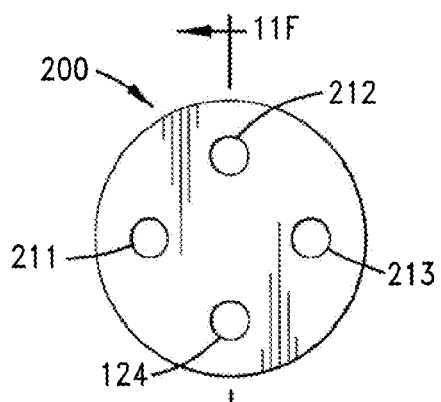
FIGS. 11A-F are a perspective view, a front view, a side view, a top view, a bottom view, and an axial cross-sectional view, respectively, of another embodiment of the invented multi-core block.
Figure 11F:
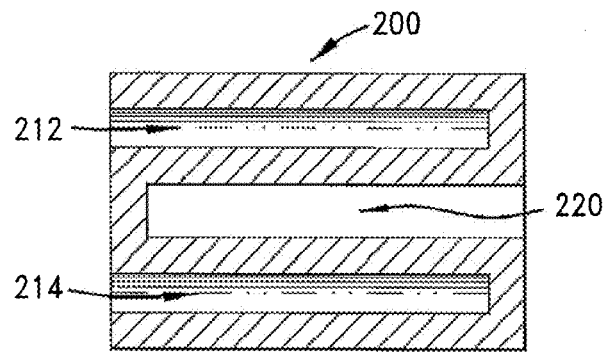
Figure 11B:
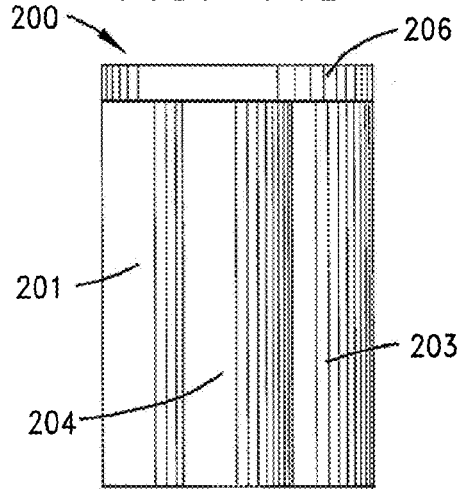
Figure 11C:
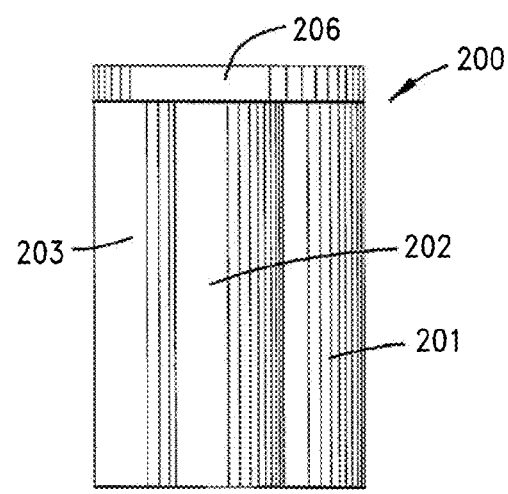
Figure 11E:
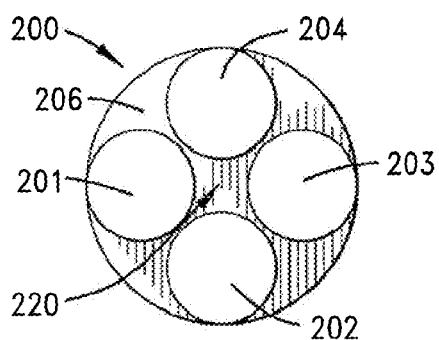
Figure 11A:
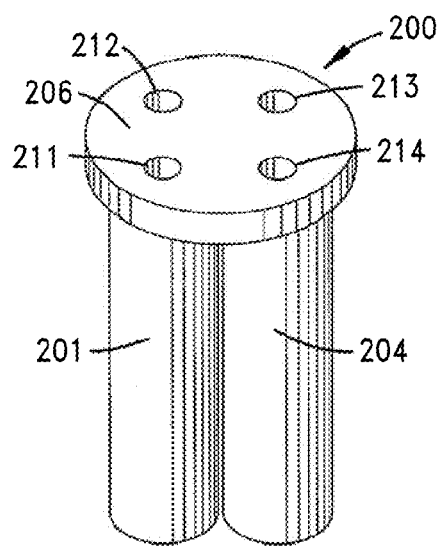
Figure 12C:
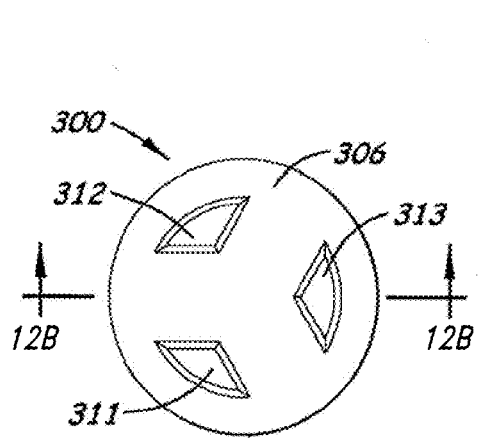
FIGS. 12A-F are a perspective view, an axial cross-sectional view, a top view, a bottom view, a front view, and a side view, respectively, of yet another embodiment of the invented multi-core block.
Figure 12A:
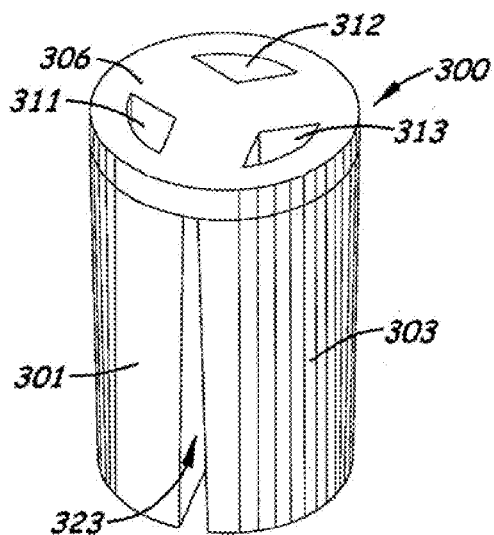
Figure 12B:
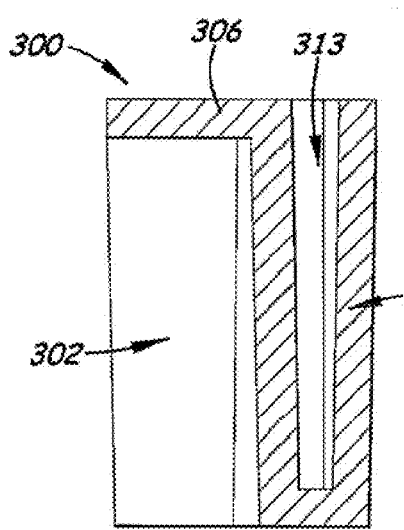
Figure 12F:
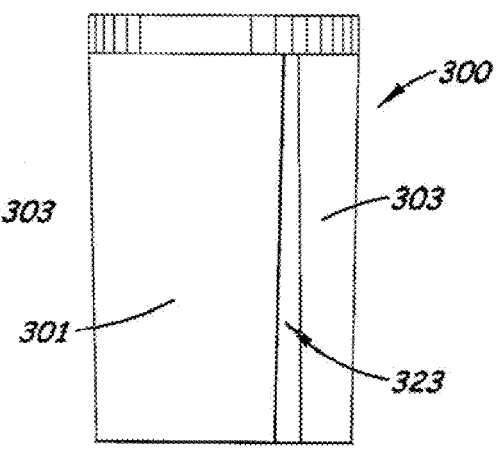
Figure 12D:
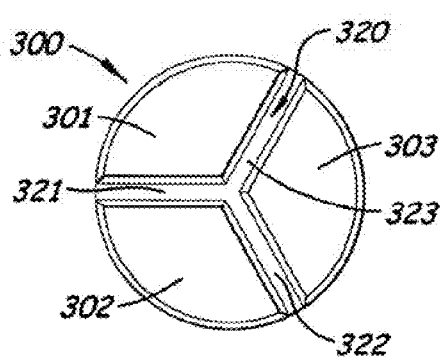
Figure 12E:
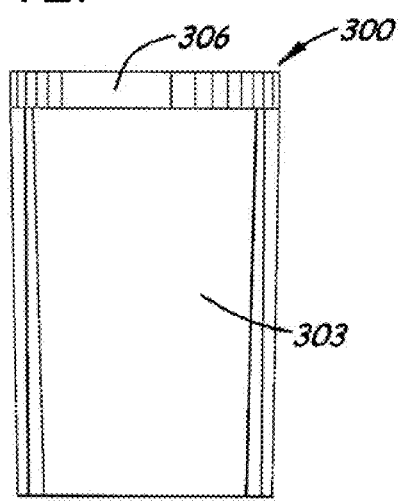
Figure 13C:
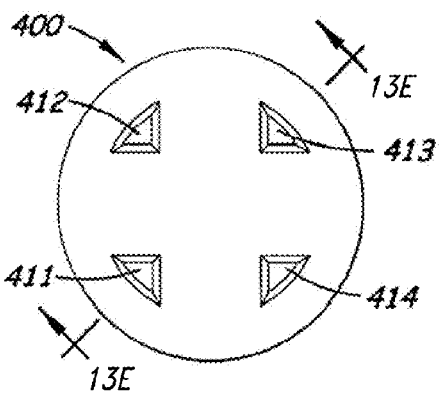
FIGS. 13A-E, show a perspective view, a front view, a top view, a bottom view, an axial cross-sectional view, respectively, of yet another embodiment of the invented multi-core block.
Figure 13A:
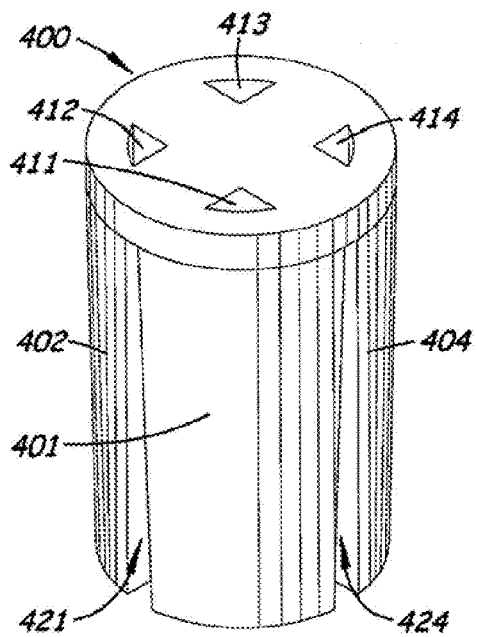
Figure 13B:
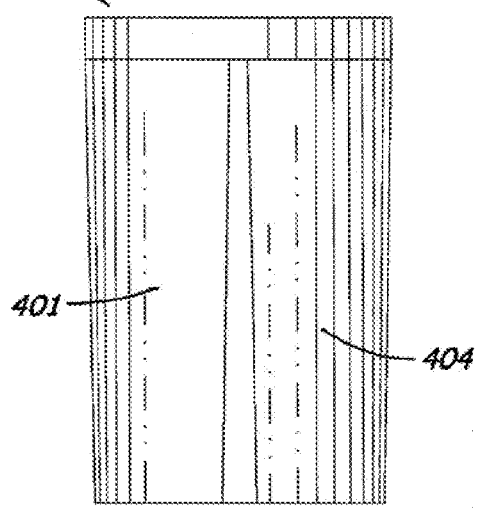
Figure 13D:
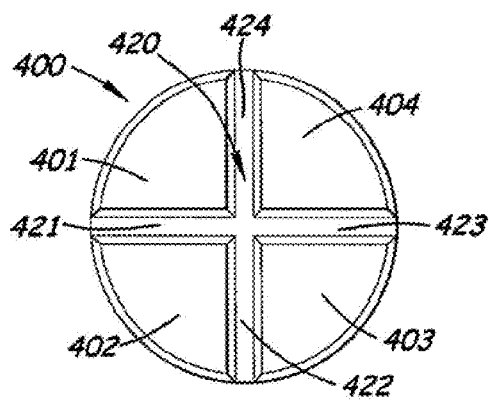
Figure 13E:
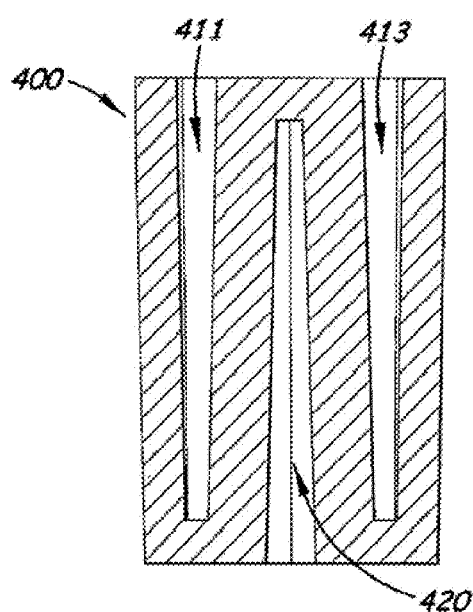
Figure 14C:
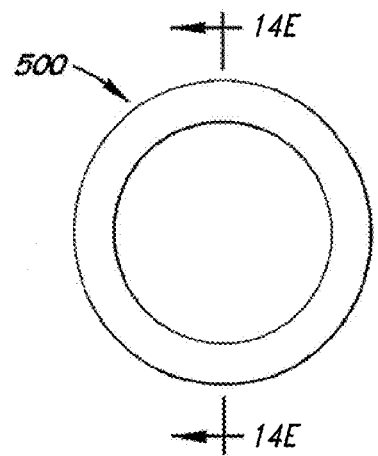
FIGS. 14A-E are two opposing side views, a top view, a bottom view, and an axial cross-sectional view of a prior art cylindrical activated carbon filter block.
Figure 14E:
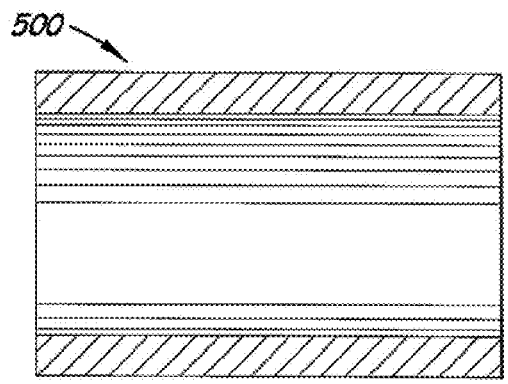
Figure 14A:
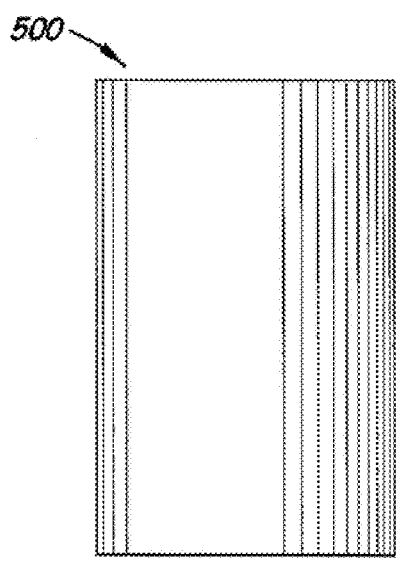
Figure 14B:
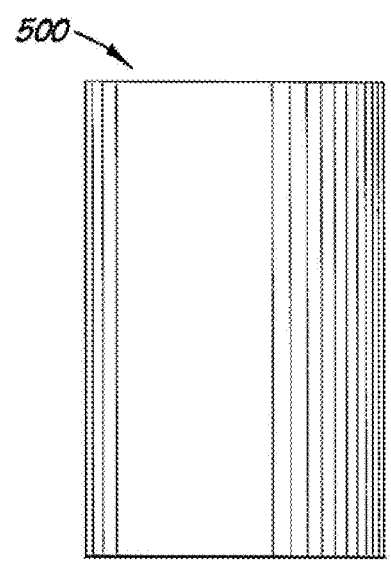
Figure 14D:
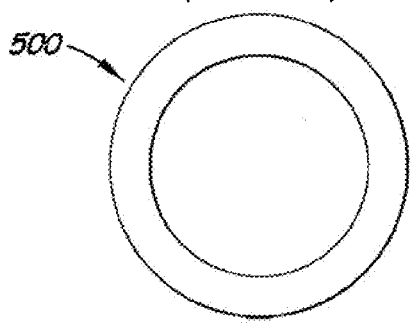
Figure 15C:
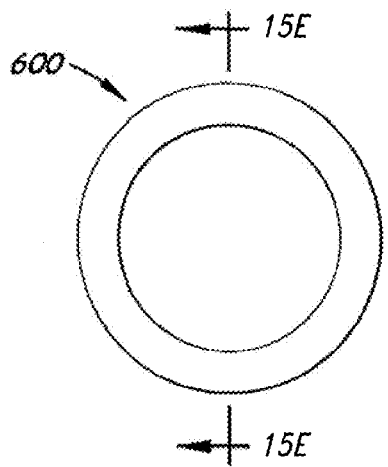
FIGS. 15A-E are a perspective view, a side view, top and bottom views, and a cross-sectional view of a cup-shaped filter block.
Figure 15E:
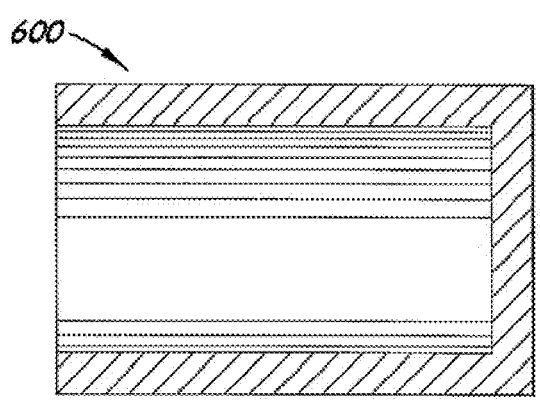
Figure 15B:
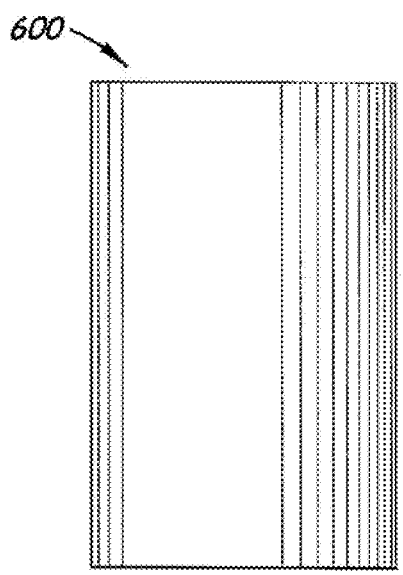
Figure 15A:
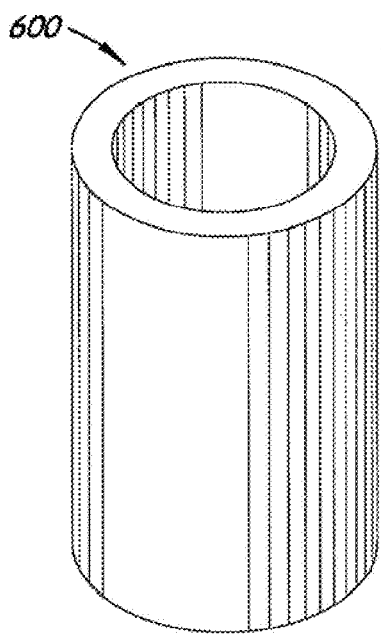
Figure 15D:
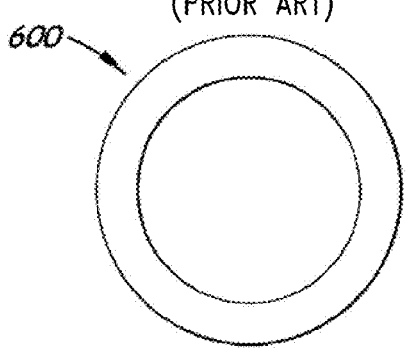
Figure 17A:
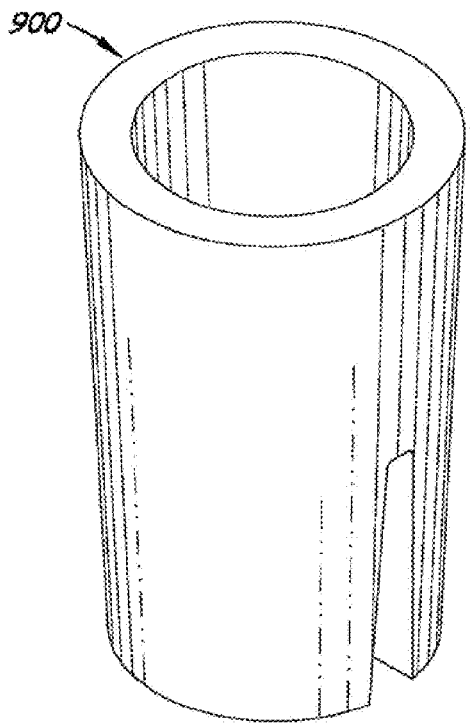
FIGS. 17A-D are a perspective view, a top view, a first perspective cross-sectional view and a second perspective cross-sectional view, respectively, of another embodiment of the invented filter block, wherein the block comprises a single cavity at its first end, which single cavity opens into (communicates with) two cavities about midway along its length, and wherein this block has no glue recess at its first end but rather a flat end surface for sealing to a housing or internals structure. The cross-sectional view in FIG. 17C is taken along a transverse plane (perpendicular to the plane that separates the two sub-blocks) and the view in FIG. 17D is taken on said plane that separates the sub-blocks).
Figure 17B:
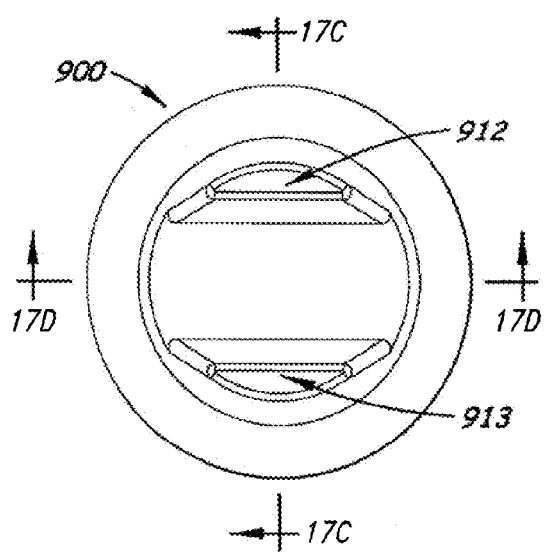
Figure 17C:
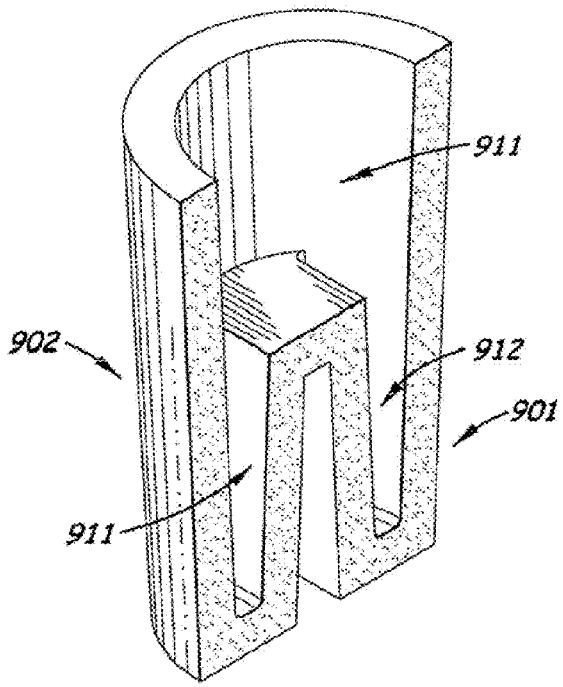
Figure 17D:
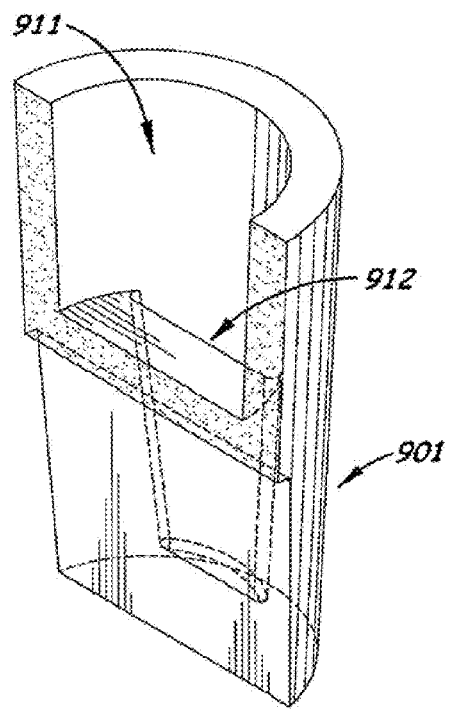

FIG. 9 is a schematic cross section showing a water flow path through the filter cartridge 30 and the carbon block filter 20. When the cap 32 is exposed to a body or flow of source water W, the source water W flows into and through the entrance openings 17b in the cap 32 and enters into the outer space 35 of the filter 20. The water W then flows through an exterior wall 21b of the filter 20, out an interior wall 21a of the filter 20, and into the inner space 22. In passing through the filter 20, the source water W becomes purified water W'. The purified water W' exits the filter cartridge 30 through the exit openings 18b.

Additional components and features may also be present, such as filter sheets, as described in U.S. patent application Ser. No. 10/881,517 to Rinker et al., which is herein incorporated by reference.

Filter Block Shapes and Dimensions

Block filters can have many shapes, such as cylinders, sheets, solids, cubes, parallelepipeds, etc. Illustrative shapes are presented below.

Factors influencing the final dimensions of a filter block include the dimensions of the cartridge housing the filter block, desired properties and efficacy of the filter, etc.

The wall thickness and the external surface area of the carbon block filter can influence the flow rate of water through the filter. In one embodiment, the median wall thickness is in the range of approximately 0.15 in. to 0.60 in. In other arrangements, the wall thickness is less than about 0.40 in., e.g., approximately 0.20 in. to 0.40 in. The filter block can have an outside diameter between about 1.5 in. to 4.0 in., and a length between about 1.0 in. to 4.0 in.

For most portable gravity-fed systems, a smaller size of the filter block is preferred. In preferred embodiments, the filter block will provide many of the benefits presented herein, and yet fit within a container having a volume of less than about 24.4 $in^3$ (400 $cm^3$), and more preferably less than about 20 $in^3$. In more preferred embodiments, the filter block will provide many of the benefits presented herein, and yet fit within a container having a volume of less than about 10 $in^3$. In an illustrative embodiment, the filter block fits within a container having a volume of about 8.6±0.5 in.

Similar container dimensions may also be used for embodiments of the present invention that are based on granular media.

The foregoing dimensions may or may not match the actual container (e.g., cartridge shell) housing the filter block or granular media as sold.

Preferred embodiments of the invention seek to maximize the volume of a filtration media block media in a given cartridge or housing total volume, while decreasing pressure drop. Each single filter block is preferably three-dimensional, with three dimensions that are of the same order of magnitude, and each single filter block according to the invention may be considered to comprise multiple, substantially separate but connected, filtration units or "cores" and, most preferably, to comprise multiple filter sub-blocks. This multiple sub-block structure is preferably accomplished by providing a block with multiple cavities, wherein each cavity, defined by a cavity surface(s), extends deep into the block. The multiple cavities allow water to flow deep inside the filter block to access the media of the sub-block (in the case wherein the cavities are at the inlet to the block) or that allows water to be collected from each filtration sub-block (in the case wherein the cavities are at the outlet from the block). The cavities may be D-shaped, circular, triangular, polygonal, or other shapes in cross-section or in end-view. These cavities may be described as internal or interior cavities, whether they are used for fluid-inlets (in inside-out flow) or fluid outlets (in outside-in flow), as they are generally inside the block, rather than on the outer surface of the block.

The blocks preferably also comprise an exterior or external cavity in the outer surface of the block to separate portions of the sub-blocks to provide a space between exterior surfaces of said portions of the sub-blocks (said exterior surfaces "facing" the exterior cavity) for fluid access out of or into said sub-blocks. Such an exterior cavity, in an inside-out flow-scheme, may allow fluid to flow out of each sub-block toward the exterior cavity for collection and flow out of the filter cartridge or housing. Such an exterior or external cavity, in an outside-in flow-scheme, may allow fluid to flow into each sub-block from said exterior cavity. This way, substantially all of the filter media of a sub-block is accessible to fluid for filtration, rather than just the media near the outer circumference of the block.

Embodiments comprising multiple-core, multiple-cavity, and/or multiple-sub-block solid profile filter media will work with many different block sizes; for example, large and small, and long and short block shapes. The preferred blocks may be considered three-dimensional rather than sheet-like or substantially two-dimensional. The filter blocks of the preferred embodiments comprise activated carbon block consisting of activated carbon particles/granules and binder particles that are formed to contain multiple sub-blocks, with a preferred additive being lead sorbent such as Alusil™ or ATS™ or arsenic removal additives. Optionally, instead of, or in addition to, carbon particles/granules, activated carbon fibers may be used with binder to connect them and hold them in the solid profile. Also, other filtration or treatment media may be used, in place of or in addition to, activated carbon.

Preferably, the opening of each cavity is located at a common first axial end, and the sub-blocks extend from that common end generally parallel to each other but preferably clustered around, or arranged symmetrically around, the center axis of the block rather than on a single plane. One or more exterior cavities may be located, for example, at or near the central axis of the block, at the opposite, second axial end, for separating the sub-blocks at or near the second axial end.

Alternatively, embodiments according to the invention may include a single cavity that, farther along the axial length, branches into multiple cavities. The opening of the single cavity is located at a first axial end of the block, the multiple cavities begin at some point or points along the length of the block, and the closed ends (or capped ends) of the multiple cavities typically lie at the second axial end opposite the single cavity opening. One or more exterior cavities may be located, for example, at or near the central axis of the block at the second end, for separating the sub-blocks at or near the second end.

Alternatively, embodiments may include a first set of multiple cavities at one end of the block, branching into different numbers or shapes of multiple cavities contained within a second set of the cavities generally midway along the length of the block. The openings of the first set of multiple cavities are located at a first axial end of the filter and the closed or capped ends of the second set of cavities is typically at the opposite end of the filter block. One or more exterior cavities may be located, for example, at or near the central axis of the block at the second end, for separating the sub-blocks at or near the second end.

Referring to FIGS. 10A-N, 11A-F, 12A-F, 13A-F, 16A-E, 17A-D, 18A-B, and 19A-C, there are shown several, but not the only, embodiments of a multiple-core filter block, along with a hollow, cylindrical filter block in FIGS. 14A-E and a cup-shaped filter block in FIGS. 15A-E, also embodiments of the present invention.

The overall shape of the filter block may or may not be cylindrical (round in cross-section or end-view) and, instead may be square, oval, triangular, or other shapes in cross-section and/or in end-view. The filter block may be considered a three-dimensional solid profile, which has three dimensions that are preferably on the same order of magnitude. For example, preferred embodiments may be dimensioned to have an axial length within the range of ⅓-10 times the diameter of the filter block, more preferably ⅓-5 times the diameter, and most preferably 1-5 times the diameter. For these calculations, the largest diameter of the block may be used, as many of the blocks are tapered in diameter. In non-cylindrical blocks, the axial length is preferably within the range of ⅓-10 times the width, more preferably ⅓-5 times the width, and most preferably, 1-5 times; and within the range of ⅓-10 times the depth, more preferably ⅓-5 times the depth, and most preferably, 1-5 times the depth.

Also, the shape of each of the filtration sub-blocks, connected together into the single solid block, may be cylindrical, conical, or square, oval, triangular, or other shapes in cross-section. The multi-core filter blocks, which are preferably made substantially of activated carbon, sorbents, powders, and/or carbon or other fibers, are bound together sufficiently to maintain the solid profile. The multi-core shape serves to increase surface area and volume of material that is active for filtration and contaminant removal. The multi-core filter block comprises a plurality of sub-blocks, each of which comprises a filter wall surrounding at least four sides, and preferably five sides, of an interior hollow cavity or space. In other words, multiple filter walls connect to each other, so that each cavity is surrounded on all four sides and, optionally, at one of its ends (fifth side). Note that the "four sides" are used representatively to describe enclosure on all sides surrounding a given axis, but not necessarily the ends, and so should be construed to encompass embodiments not traditionally having four sides, such as triangles, cylinders, etc. The filter walls defining the sub-blocks may connect to each other all the way to the end of the block, or, there may be one or more cavities separating the sub-blocks along at least a part of the sub-blocks, such a slots, holes, or other shapes of exterior cavities.

The preferred configurations include at least one end of each cavity being closed, preferably by additional filter wall that extends radially. This radial filter wall has a thickness sufficient to close, and, in effect, to "seal" each cavity, and/or to properly filter any fluid that passes through it. With the radial filter wall at least as thick as the axial filter walls, the fluid will tend to flow radially through the generally-axial filter walls, but, if the fluid does flow axially through the radial filter wall, the fluid will be appropriately filtered. In most embodiments, the cavity walls that create the inside surface areas do not protrude through the entire length of the block shape and so the radial filter wall, instead of a housing plate or cap, serves to close one end of the cavities. In less-preferred embodiments wherein the cavities protrude through the entire length of the block shape, an additional sealing plate, or cap may be used to maintain radial flow through the axial filter walls.

The activated carbon block shapes shown in FIGS. 10A-N through 13A-F have shapes that can be described as a multiple cavity mold. The filter block 100 in FIGS. 10A-F may be described as a "two-core" or "two-sub-block" filter block, wherein each of the two sub-blocks 101, 103 may be called generally semi-cylindrical or a generally D-shaped sub-block. Also, filter block 100 is preferably provided with a tapered outer axial surface 102 outer diameter from larger at the top end to smaller at the bottom end, and having two generally D-shaped cavities 104 extending axially in the block. The cavities 104 have D-shaped openings 106, both at the top end, with the cavity preferably maintaining generally a D-shape throughout the length of the cavity, but with the size of the cross-sectional D-shape becoming smaller toward the bottom end of the cavity in view of the preferred slanted inner walls or cavity surfaces 108. Preferably both "sides" of the cavity wall (108, 108') are slanted/tapered, to ease removal from the mold. An exterior cavity in the form of slot 112 extends into the bottom outer surface of the block creating a slot surface portion 114 of the outer surface of the block, further separating the two sub-blocks and providing access for water in between the sub-blocks (either water entering the block from the outside of the block (outside-in flow) or water exiting the block (inside-out flow).

A lip, depression, or other ring structure 116 preferably surrounds the top end of the block, as a recess for receiving adhesive for sealing the top end of the filter to a housing, thus, preventing water from bypassing around the top end of the filter. The block structure, combined with the adhesive or other seal, may eliminate the need to place a plastic plate at the top end of the filter. This way, water flow may be controlled, for example, in the case of inside-out flow, the water enters only at the cavities openings 106 and flows generally radially through preferably all the generally axial block walls (illustrated as 121, 122, 123, 124 in FIG. 10F) and typically also flow generally axially through radial walls (shown as 125 and 126 in FIG. 10F). In the case of outside-in flow, the water enters only at the outer surface (102 and 114) and flows generally radially through the axial walls (121, 122, 123, 124) inward to the cavities 104 and typically may also flow axially through radial walls 35, 36 into the cavities 104.

The block in FIGS. 10A-F, in one preferred version and size, has a major outside diameter of 1.95 inches, a wall thickness of about 0.26 inches, and a length of about 3 inches. This results in 5.41 cubic inches of volume and a surface area substantially increased by the walls 108, 108' of the interior cavities 104 and walls 114 of exterior cavity slot 112.

The filter block 200 of FIGS. 11A-F comprises multiple generally cylindrical sub-blocks 201, 202, 203, 204 or four "cores" of media that are connected together by a top plate 206 of media with openings 208 into the cavities 211, 212, 213, 214. Top plate 206 need not be, and preferably is not, a separate structure, but is instead integral with the multiple sub-blocks. In cross-section, as viewed along line B-B, one may see just two of the sub-blocks 202, 204 and just two of the cavities 212, 214. Again, there is an opening/space between the sub-blocks (in this embodiment, channel 220) that allows water access between the sub-blocks, preferably either to reach the outer surface of the sub-block portions "facing" each other for flow outside-in even in the area between the sub-blocks, or for water collection between the blocks after inside-out flow out of the sub-blocks.

Block 200 in one preferred version and size has a major outside diameter of about 1.95 inches, a length of about 3 inches, and a wall thickness of about 0.26 inches, a volume of 5.6 cubic inches, and a surface area substantially increased by the interior cavities 211, 212, 213, 214, and exterior cavity/channel 220.

Block 300 in FIGS. 12A-F comprises multiple (three) generally semi-cylindrical sub-blocks 301, 302, 303 or three "cores" of media that are connected together at their tops at top portion 306 having openings 308 into the cavities 311, 312, 313. In cross-section, as viewed along line C-C, one may see just one of the sub-blocks 303 and just one of the cavities 313. Again, there is an opening/space between the sub-blocks (in this embodiment, slot 320 with slot arms 321, 322, 323) that allows water access between the sub-blocks, preferably either to reach the outer surface of the sub-block portions "facing" each other for flow outside-in even in the area between the sub-blocks, or for water collection between the blocks after inside-out flow out of the sub-blocks.

Block 300 in one preferred version and size has a major outside diameter of about 1.95 inches, a length of about 3 inches, a wall thickness of about 0.26 inches, a volume of 6.31 cubic inches, and a surface area substantially increased by interior cavities 311, 312, 313, and exterior cavity 320 (slot portions 321, 322, 323).

Block 400 in FIGS. 13A-E comprises multiple (four) generally semi-cylindrical sub-blocks 401, 402, 403, 404 or four "cores" of media that are connected together at their tops at top portion 406 having openings 408 into the cavities 411, 412, 413, 414. In cross-section, as viewed along line D-D, one may see just two of the sub-blocks 401, 403, and just two of the cavities 411, 413. Again, there is an opening/space between the sub-blocks (in this embodiment, slot 420 with slot arms 421, 422, 423, 424) that allows water access between the sub-blocks, preferably either to reach the outer surface of the sub-block portions "facing" each other for flow outside-in even in the area between the sub-blocks, or for water collection between the blocks after inside-out flow out of the sub-blocks.

Block 400 in one preferred version and size has a major outside diameter of about 1.95 inches, a length of about 3 inches, a wall thickness of about 0.26 inches, a volume of 6.42 cubic inches, and a surface area substantially increased by interior cavities 411, 412, 413, and 414, and exterior cavity 420 (slot arms 421, 422, 423, 424).

FIGS. 14A-E show an activated carbon block 500 using a cylindrical structure. For the sake of comparison, the hollow cylindrical block 500 in FIGS. 14A-E may be formed to have the same major outside diameter (about 1.95 inch), the same length (about 3 inches), and the wall thickness (about 0.26 inches) as the example sizes of blocks 100, 200, 300, 400. The hollow, cylindrical block in FIGS. 14A-E has an ID of about 1.43 inches. One may note that, in this cylindrical block 500, the interior surface/space substantially matches the exterior surface; that is, the inner surface is a cylinder and the outer surface is a cylinder. The block 500 does not have additional cavities or cavity surfaces, either on the interior or the exterior, to add to the fluid-accessible surface area.

FIGS. 15A-E illustrate that one may add a "bottom" to the cylindrical block, making a standard single-cup filter block 600 having an axial cylindrical wall and a radial bottom wall. One may see that the cup in FIGS. 15A-E may be formed to have the same major outside diameter (about 1.95 inch), the same length (about 3 inches), and the wall thickness (about 0.26 inches) as the example sizes of blocks 100, 200, 300, 400, 500. Block 600 has an ID of about 1.43 inches. The total surface area of this block 600 is about 36.67 square inches, but the flowable surface area (minus one end surface that is typically sealed to housing or internals) is about 35.29 square inches, which is below the multi-core embodiments. One may note that, in this cup-shaped block 600, the interior surface/space substantially match the exterior surface; that is, the inner surface is a cup-shape and the outer surface is a cup-shape. The block 600 does not have additional cavities or cavity surfaces, either on the interior or the exterior, to add to the fluid-accessible surface area.

It is clear from the examples in FIGS. 1A-F through 13A-E, all having the same overall diameter and overall length as the cylindrical block (FIGS. 14A-E) and the cup-shaped block (FIGS. 15A-E), that multiple-core activated carbon block shapes according to many embodiments of the invention will increase inlet or outlet surface area (and preferably both) for a given volume of activated carbon material and for a given filter cartridge volume, housing volume, or "package" volume. An important design feature for a filter cartridge in a gravity-flow water pitcher or tank is to minimize the total space that a cartridge or filter housing takes up (also called the filter "package" volume) inside the pitcher or tank. Therefore, embodiments of the invention that minimize the package volume, while providing excellent filtration performance and life and good flow-rates, will be particularly beneficial for said pitcher or tank applications.

FIGS. 16 A-E portray one, but not the only, embodiment of a filter block 800 that includes a brace 822 or partition dividing or extending into the indentation space. Filter block 800 is similar to filter block 100, in FIGS. 10A-M, except that the brace 810 extend between and connects the two sub-blocks in a portion of the indentation space. As seen to the best advantage in FIG. 16C, this brace 810 does extend substantially all the way along the length of the sub-blocks, but there is still an indentation on each side of the brace 810 that separates/spaced the sub-blocks. Thus, it may be said that there are two indentations 821, 822 extending into the filter block 800 (from the bottom and the side of the filter block) along a substantial amount of the length of the sub-blocks. The reinforcement of the brace 810 helps prevent the filter block sub-blocks from snapping off or otherwise being damaged, and, because of the presence of the two indentations, said brace 810 preferably does not significantly reduce fluid access to the surfaces of the indentation. The brace 810 is preferably thin and tapered, to minimize its impact (reduction) on the indentation surface area.

FIGS. 17A-D portrays an alternative embodiment of the invented filter block 900 comprising a single cavity 911 at a first end opening into two cavities 912, 913 part way along the length of the filter block. This filter block 900 may be described as having a single filtration unit/sub-block at said first end and two sub-blocks 901, 902 an opposite end of the filter block 900, wherein the cavity 911 of the first sub-block 901 is in fluid communication with the cavities 912, 913 of the other sub-blocks 902, 903. Thus, this is one example of a branched cavity arrangement.

Figure 18A:
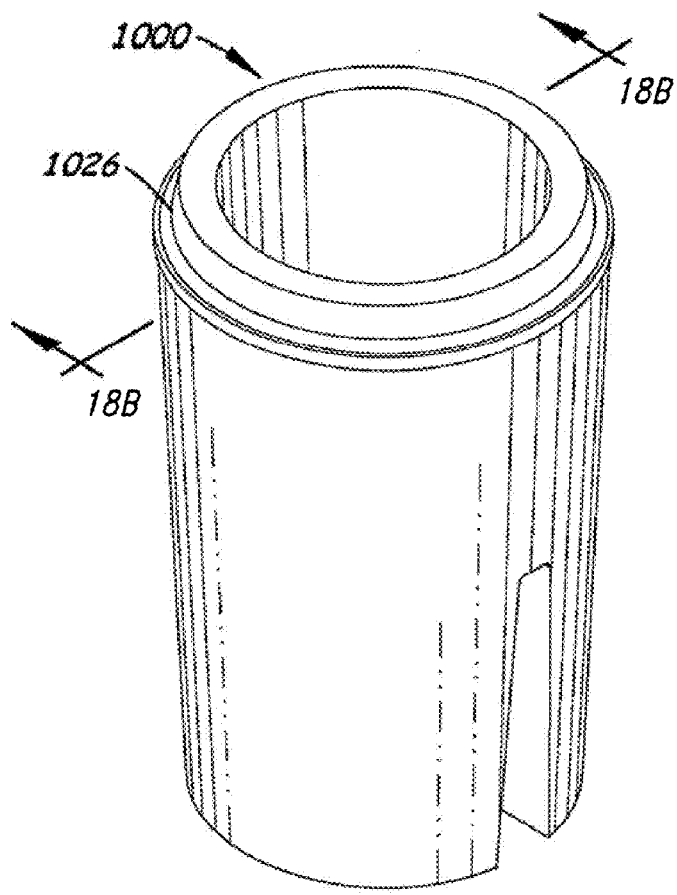
FIGS. 18A and 18B are a perspective and a perspective cross-sectional view, respectively, of another embodiment of the invented filter block that is similar to the embodiment of FIGS. 17A-D except that this block has a glue recess encircling its first end.
Figure 18B:
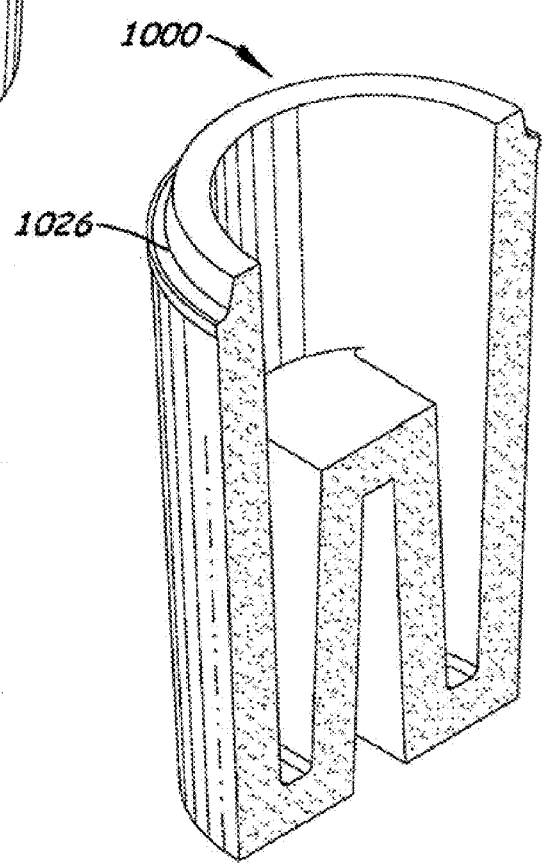
Figure 19A:
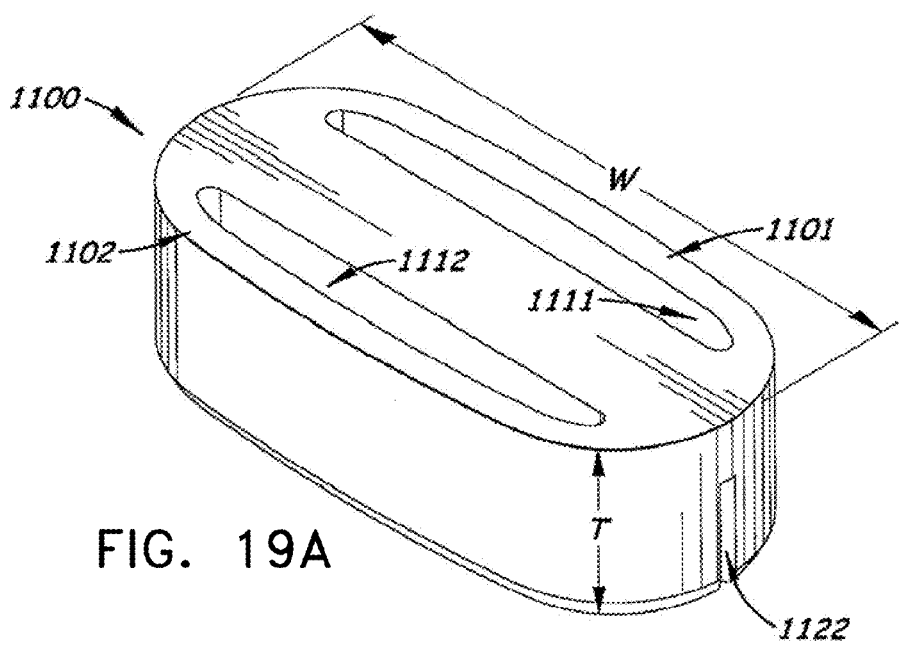
FIGS. 19A-C are a perspective, a perspective transverse (to the plane between the sub-blocks) cross-sectional view, and a perspective cross-sectional view along the plane between the sub-blocks, respectively.
Figure 19B:
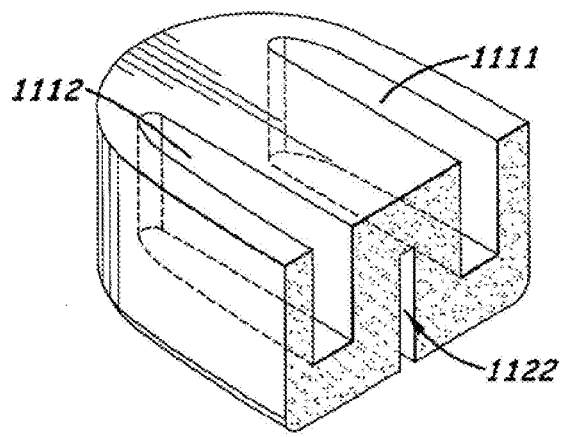
Figure 19C:
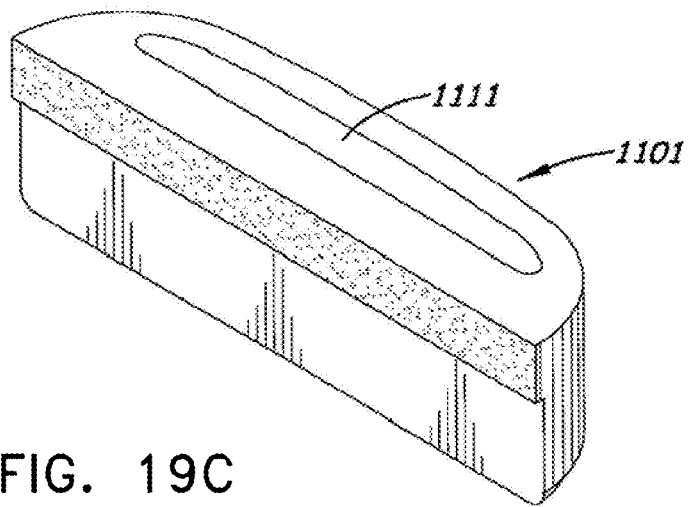

FIGS. 18A-B portray a filter block 1000 that is that same as block 900 in FIGS. 17A-D except that block 1000 has a glue depression ring 1026 around the top of the block. This depression may receive glue, or otherwise seal, to a housing or internals member for controlling fluid flow.

FIGS. 19 A-C portray an alternative filter block 1100 for a shorter housing, wherein the filter block 1100 and its sub-blocks 1101, 1102 are wider (W) than they are tall (T). This block 1100 has two D-shaped cavities 1111, 1112 in a first end and a slot 1122 (another example of an indentation) in the second, opposing end separating portions of the two sub-blocks 1101, 1102.

Figure 20A:
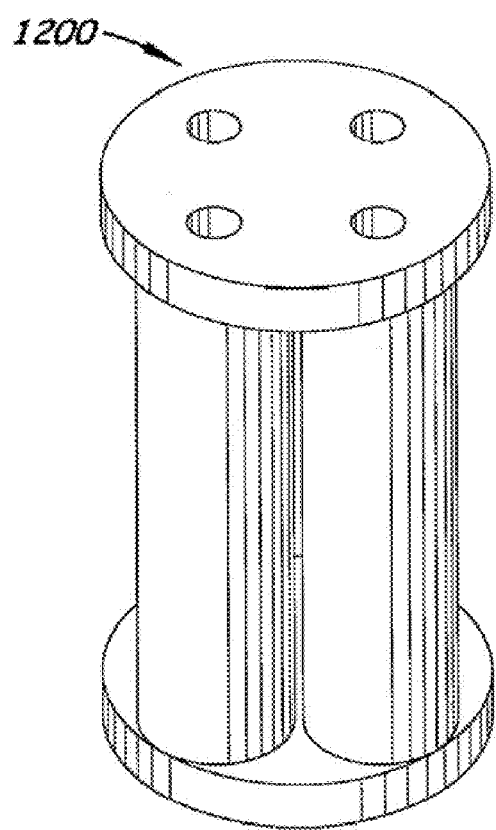
FIGS. 20A and B illustrate alternate embodiments of the invented multiple sub-block filter blocks comprising indentations into the filter block, wherein the indentations extend into sides of the filter block and not into the bottom of the filter block. Thus, the sub-blocks of these filters are attached/connected, rather than being separated/spaced at their bottom ends.
Figure 20B:
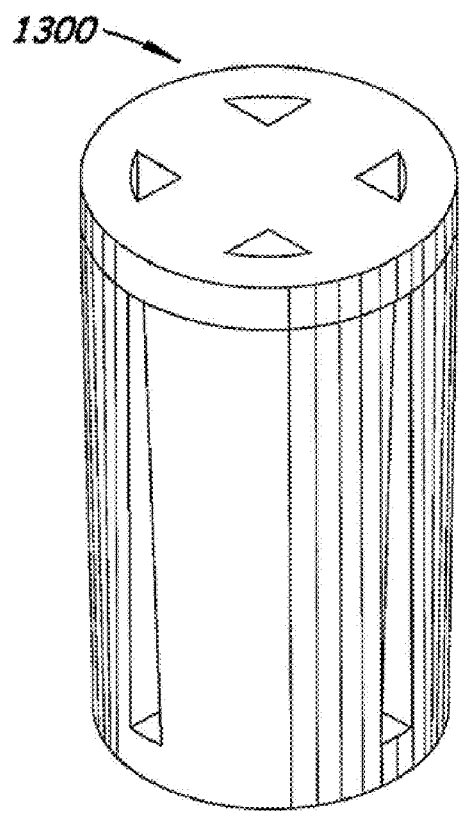

FIGS. 20A and 20B illustrates alternative embodiments 1200, 1300 of multicore, multiple-sub-block filter blocks wherein multiple cavities are supplied to form the multiple sub-blocks, and indentations are also supplied to further separate the sub-blocks to provide additional fluid access to inner regions of the filter block. The indentations are provided in the form of gaps/spaced between the sub-blocks in regions generally midway along the length of the sub-blocks but not at the bottom of the sub-blocks. These filter blocks are some, but not the only, embodiments that comprise indentation(s) that extend into the filter block at the other than an end of the filter. These indentations/gaps/spaces may be described as extending into a side/sides of the filter block or extending radially into the filter block, Thus, it may be seen that, in some embodiments, indentations may extend into a central region of the filter block but not into either end of an elongated filter block. It may be noted that the bottom end of filter block 1200 comprises a solid bottom plate connecting the sub-blocks, wherein, in some embodiments there may be a seam/interface between the bottom plate and the sub-blocks comprising preferably a layer of adhesive, glue, or melted and/or re-solidified binder directly connecting the bottom plate to the sub-blocks.

It may be noted that the bottom ends of the sub-blocks of filter block 1300 are preferable integrally connected with each other rather than comprising a glued or bonded seam/interface.

Many, but not all, embodiments of the multiple-sub-block solid profile filters use activated carbon and thermo-set binder, and the preferred proportions may range from about 5 up to about 70 weight percent binder, and 95 down to about 30 weight percent activated carbon plus additives. More preferable, many embodiments comprise 10-50 weight percent binder and 90 down to 50 weight percent activated carbon plus additives.

An especially preferred composition, for example, for gravity flow or low-pressure filter blocks according to embodiments of the inventions is: 30-50 wt-% binder(s), 28-52 wt-% powdered or granular activated carbon, and 18-22 wt-% lead removal media, wherein the total of the binder, activated carbon and lead removal media 100-%. Filter blocks, in the shape represented by FIGS. 10A-N, have been made from about 40 wt-% UHMWPE binder, about 38 wt-% powdered activated carbon, and about 22 wt-% lead removal (Alusil™) media. Activated carbon size distribution such as the following was used: D10 of about 10-30 microns; D50 of about 70-100 microns; and D90 of about 170-200 microns. These blocks, made in the shape of FIGS. 10A-N have been found to perform effectively in water filtration, including obtaining lead removal results that meet the recent NSF Standard 53 for lead in drinking water (less than 10 ppb lead, that is less than 10 ppb total of soluble and particulate lead), while also achieving a flow rate of 1 liter per 4-7 minutes flow rate of water filtration. It is noteworthy that the multiple-sub-block filter block providing this excellent performance had only about a 2 inch outer diameter and about a 3 inch axial length, comprised only binder, activated carbon and lead sorbent in a solid profile, and did not contain any ion exchange resin or zeolite (which are conventionally used in gravity flow filters for metals removal). Such performance could result a filter cartridge, for a water carafe or other gravity flow apparatus, of overall dimensions of less than 3 inches in diameter and less than 5 inches in length, for example, meeting the recent NSF Standard 53 for lead removal. The inventors also believe that this performance may be achieved, with embodiments of the multiple-sub-block filters, over a long filter life.

Embodiments presented herein, including the multi-core, multi-cavity, or multi-sub-block solid profile media, may be used in liquid filtration applications and also in air or other gaseous material filtration applications. While the filters in the drawings, and the terminology used herein, are shown or described in terms of "up" and "down," the filters are not limited to a particular orientation; various housings and internals may be used, as will be understood by one of average skill after viewing this disclosure and the accompanying drawings, that may place the filters in various orientations other than those shown.

Thus, one may see, from the above discussion of interior cavities, that the multiple sub-block form of the preferred embodiments may include, for example: a block that has multiple, connected filtration units or sub-blocks extending all along the block length; a block with a first axial end region that comprises a single filtration unit or sub-block, transitioning to a middle or second axial end region comprising multiple filtration units/sub-blocks; or a block with a first axial end region comprising multiple, connected filtration units/sub-blocks transitioning to middle or second axial end region comprising different multiple filtration units/sub-blocks.

Processing

A carbon block filter can be manufactured using conventional manufacturing techniques and apparatus. In one embodiment, the binder, carbon granules, and other actives are mixed uniformly to form a substantially homogeneous blend. The blend is then fed into a mold having an inner surface conforming to the desired outer surface of the block filter, and that has an upwardly projecting member or members that define the cavity of the resultant block filter. The mold is heated to a temperature in the range of approximately 175-205° C. The optional, but preferred, compression may take place before heating, during heating, and/or after heating. Compression, if performed, is preferably performed at a pressure of less than about 100 psi. After cooling, the resulting porous composite carbon block is removed from the mold and trimmed, if necessary.

As noted above, in the processing of the carbon block, compression can be applied in order to achieve a more consistent and stronger carbon block than can be achieved using a sintering process as commonly practiced in the porous plastics industry. Compression can facilitate good contact between powdered or granular media and binder particles by pressing the powdered media into the binder. Compression can also prevent cracking and shrinkage of the carbon block while the filter is cooling in the mold. Thus, in one embodiment of the invention, a compression that reduces the fill height of the mold in the range of approximately 0%-30% is employed. In some arrangements, the compression reduces the fill height of the mold in the range of approximately 5-20% or 10-20%. In other arrangements, the compression reduces the fill height of the mold by no more than approximately 10%. In yet another arrangement, no compression is applied.

Molding or otherwise forming the embodiments shown in FIGS. 10-13 and 16-19 may pose particular problems due to the preferred sub-block structure and the deep penetration of the cavities into the sub-blocks. Unless special adaptation is made in many embodiments, blemishes, holes, torn or destroyed sub-block walls, and/or other imperfections in the block may occur during separation of the block and the mold/tools. As a filter block with uniform flow distribution is an important object of these embodiments, such imperfections are usually not acceptable. Therefore, the embodiments shown include adaptations in the block shape, to allow for proper removal of the block from the mold or other forming tools. The adaptations may include orientation of the sub-blocks to be "clustered" around a central axis, shape and diameter of the cavities adapted to minimize thin portions extending transverse to the direction in which the block is removed from the block, and tapering/slanting of the outside surface of the block, including the exterior cavity surfaces, and/or the internal surfaces forming the interior cavities. These adaptations allow fabrication of various embodiments that achieve the objectives of a relatively large volume of media, with a low pressure drop, good flow distribution, coupled with durability and performance consistency.

When forming the embodiments shown in FIGS. 10-13 and 16-19, the mixture of media components and binder(s) may be placed in a mold, and may optionally be compressed with a piston or weight on the mixture for example, and heated to make the binder tacky enough to stick to the media particles, thus, holding them together in a solid profile when cooled. Typically, heating in a 400-500 degree F. oven for about 30 minutes will effectively heat the mixture to reach the desired amount of binder tackiness. The optional, but preferred, compression may take place before heating, during heating, and/or or after heating. The optional compression that reduces the volume of the mixture about 10-20 percent is preferred, but this may vary and may extend to a greater or lesser range of compression.

Performance

Some embodiments include filters for use in gravity and low pressure applications that meet a specific performance range of operation defined by filter volume, defined usage lifetime, average time of filtration, and/or lead reduction ability. The nature of the filter meeting the following performance criteria is independent of the exact embodiment of the filter and thus applicable to mixed-media, carbon blocks, non-wovens, hollow fibers and other filtration formats.

FRAP Factor

In one approach, the performance range is defined by a factor accounting for all of the above listed attributes. The factor is designated the Filter Rate and Performance Factor (FRAP) Factor. Preferred filters have a FRAP Factor ranging from 0-350, preferably less than about 200, as defined by the following formula:

$$FRAP = \frac{[V*f*c_e]}{[L*2]}$$

where:
V=volume of the filter media (cm³),
f=average filtration unit time over lifetime L (min/liter),
$c_e$=effluent lead concentration at end of lifetime L when source water having a pH of 8.5 contains 90-120 ppb (μg/liter) soluble lead and 30-60 ppb (μg/liter) colloidal lead greater than 0.1 μm in diameter
L=filter usage lifetime claimed by a manufacturer or seller of the filter (gallons).

The filter volume (V) is defined as the volume of filtering media or active media. This equates to the hydrated bed volume for mixed media filters and the mold volume for the carbon block filters. In preferred embodiments, the volume of the filter media (V) is less than about 300 cm³, and more preferably less than about 150 cm³.

The average filtration unit time (f) is defined as the time it takes to filter one liter of water averaged over all filtered liters in the defined filter lifetime. In preferred embodiments, the average filtration unit time (f) is less than about 12 minutes per liter, and more preferably less than about 6 minutes per liter.

The effluent lead concentration ($c_e$) is the amount of total lead (soluble and colloidal) remaining in the water after filtration for the last liter of water filtered in the defined filter lifetime when the influent (source) challenge water is pH 8.5 water containing 150±15 ppb of total lead with 30±10% being colloidal lead greater than 0.1 μm in diameter.

Preferably, the source water is prepared as defined in the NSF/ANSI 53 protocol (2007). Illustrative source water specifications according to the NSF/ANSI 53 protocol (2007) are as follows:
135-165 ppb total lead content
20-40% of lead in colloidal form, size greater than 0.1 μm greater than 20% of the colloidal lead must be in the 0.1 μm to 1.2 μm size range.

Hardness, alkalinity, chlorine content and pH of the water is specified as follows:

| Hardness | 90-110 mg/L |
| --- | --- |
| Alkalinity | 90-110 mg/L |
| Chlorine | 0.25-0.75 mg/L |
| PH | 8.3-8.6 |

The filter usage lifetime (L) is defined as the total number of gallons that can be effectively filtered according to claims presented by the manufacturer or seller of the filter. Typically these claims are present on the product packaging in the form of instructions to a consumer as to a quantity of water that can be filtered before the filter should be changed. The lifetime claims may also be presented in the manufacturer's or seller's advertising. Such claims typically bear some relationship to some performance attribute of the filter. Typically, filter usage lifetime claims require a substantiation process, and in some cases, a competitor may be able to challenge such claims in a judicial or non-judicial process.

During FRAP testing, the source water is gravity-fed in batches of 1 liter. Preferably, the testing is performed in the container for which the subject filter is designed.

FRAP performance testing may be conducted according to the NSF/ANSI 53 protocol. Requirements and procedures of the NSF/ANSI 53 protocol are available in a document entitled "Drinking water treatment units—Health effects", available from NSF International, 789 North Dixboro Road, P.O. Box 130140 Ann Arbor, Mich. 48113-0140, USA (Web: http://www.nsf.org), and which is herein incorporated by reference.

The FRAP factor criteria set forth herein is applicable to all embodiments of pour through filters including but not limited to mixed media (carbon and ion exchange resin), carbon blocks with any type and size of carbon and binder material with and without lead sorbent. Other embodiments of the present invention include alternate filtration techniques such as membranes, nonwovens, depth media, nanoparticles and nanofibers, ligands, etc.

Figure 21:
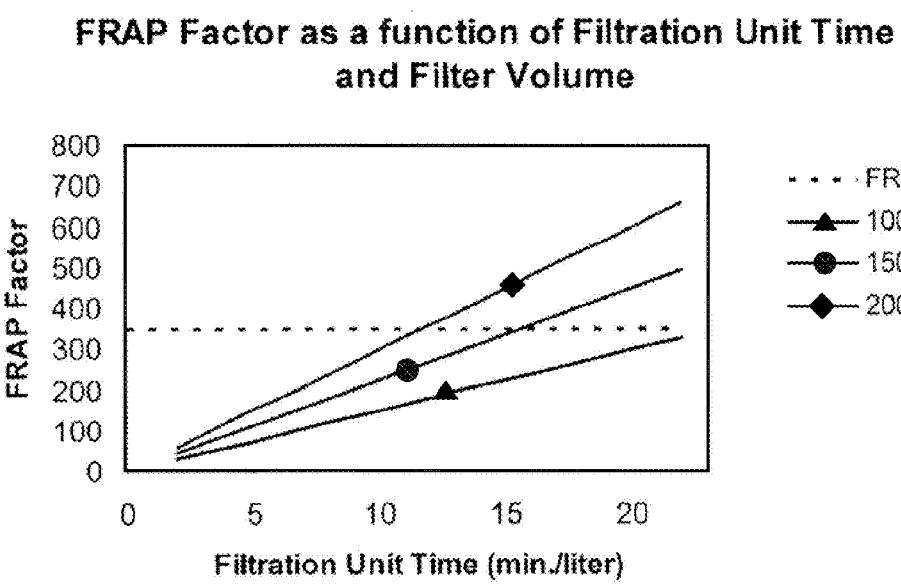
FIG. 21 is a graphical representation of filter FRAP factors as a function of filtration unit time and volume.
Figure 22:
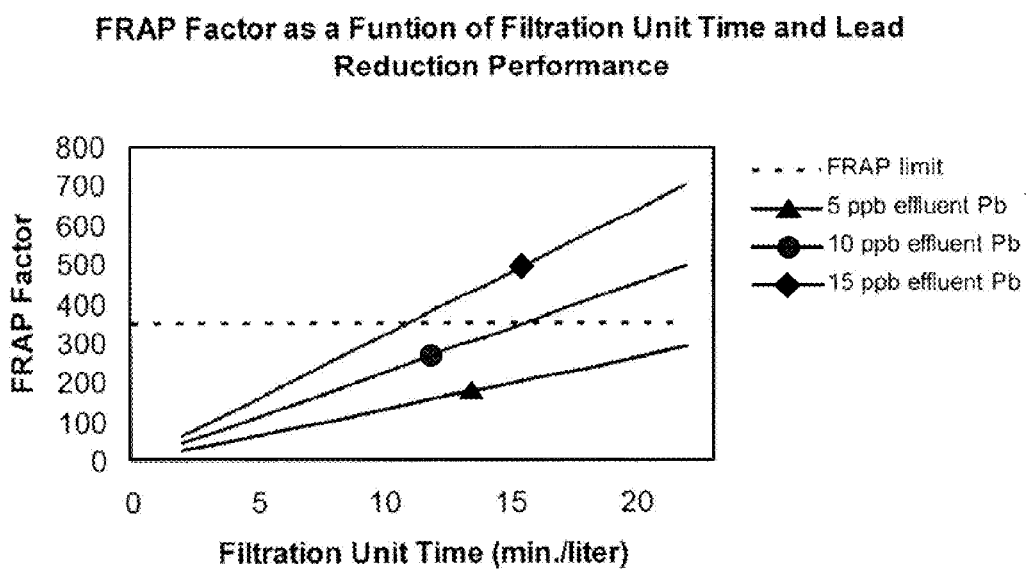
FIG. 22 is a graphical representation of filter FRAP factors as a function of filtration unit time and lead reduction.
Figure 23:
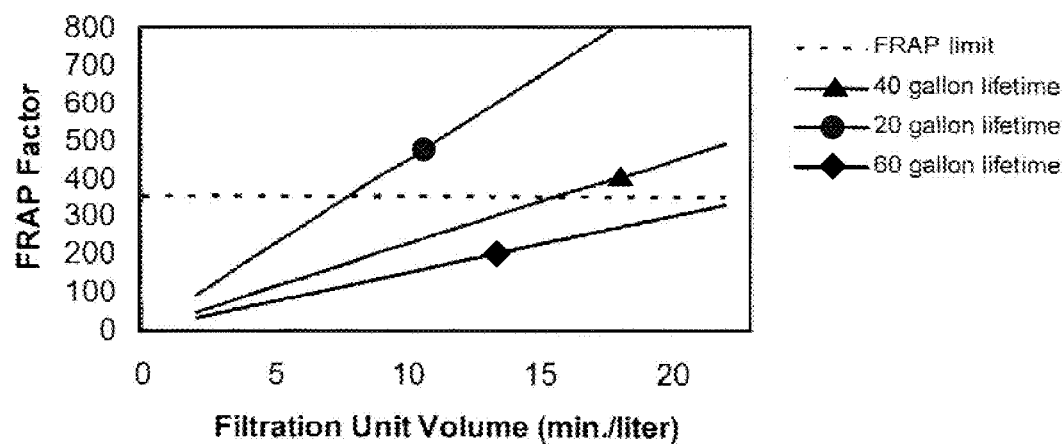
FIG. 23 is a graphical representation of filter FRAP factors as a function of filtration unit time and filter lifetime.

FIGS. 21-23 are graphical representations of filter FRAP factors as a function of filtration unit time and volume, lead reduction, and filter lifetime, respectively.

FIG. 21 is a chart 2100 graphically depicting the FRAP factor as a function of filtration unit time for filters having three different volumes (V). As shown, the larger the volume and longer filtration unit time (f), the higher the FRAP factor.

FIG. 22 is a chart 2200 graphically depicting the FRAP factor as a function of filtration unit time for filters relative to lead reduction performance. As shown, the better the lead removal and shorter the filtration unit time (f), the lower the FRAP factor.

FIG. 23 is a chart 2300 graphically depicting the FRAP factor as a function of filtration unit time for filters relative to lead reduction performance. As shown, the shorter the filter lifetime (L) and longer the filtration unit time (f), the higher the FRAP factor.

Several gravity fed carbon blocks and mixed media filters have been tested for flow rate and lead reduction capability against the defined lead challenge water. Filters tested include several formulations of carbon blocks along with commercially available mixed media filters produced by BRITA® and PUR®. Based on the results from testing, the FRAP factors were calculated for each filter and reported below. No mixed media filters tested met the claimed FRAP factor range due to their inability to remove particulate lead. The formulations of gravity fed carbon blocks disclosed are unique in there ability to meet the required FRAP factor. The "Examples" below include many examples of gravity flow carbon blocks that have a FRAP factor of less than 350. It is not believed that any currently-marketed gravity-flow filters have a FRAP factor of less than 350.

Preferably, a lead concentration in a final liter of effluent water filtered by the filter is less than about 10 μg/liter after approximately 151 liters (40 gallons) of source water filtration, the source water having a pH of 8.5 and containing 135-165 parts per billion total lead with 30-60 ppb thereof being colloidal lead greater than 0.1 μm in diameter, fed in batches of about one liter with a head pressure of between approximately 0.1 and 1.0 psi.

EXAMPLES

Embodiments of the present invention are further illustrated by the following examples. The examples are for illustrative purposes only and thus should not be construed as limitations in any way.

All scientific and technical terms employed in the examples have the same meanings as understood by one with ordinary skill in the art. Unless specified otherwise, all component or composition percentages are "by weight," e.g., 30 wt %.

Example 1

As noted above, various sizes and types of media may be used. Many, but not all, embodiments may use activated carbon particles and thermo-set binder. In multiple-core filter blocks as illustrated in FIGS. 10-13 and 16-19, illustrative proportions of the various filter materials may be in the range of 5-45 weight percent binder, 95-35 weight percent activated carbon particles such as granular activated carbon "GAC" and, more preferably, 20-40 weight percent binder and 60-30 weight percent activated carbon particles such as GAC. A lead or arsenic sorbent may be added, typically in place of a portion of the GAC.

Example 2

In multiple-core filter blocks as illustrated in FIGS. 10-13 and 16-19, examples of compositions are: 45-80 weight %, 10-15 weight % lead sorbent (such as Alusil™ 40-70, or others); and 10-40 weight % binder particles. The activated carbon may be 80×325 mesh. An activated carbon with size distribution such the following, for example, may be used: D10 10-20 microns; D50 80-90 microns; and D90 180-200 microns.

Examples 3A-E

Gravity fed carbon blocks have been formulated in cylindrical multiple-core blocks (referred to as "CMC" blocks) having a shape as shown in FIGS. 10A-F. The blocks shapes provide large surface areas in the given volumes. The blocks are comprised of activated carbon in powder or fiber form, low melt flow high molecular weight binder, and a lead sorbent material.

The CMC blocks in this example have a volume of approximately 80 cm$^3$ with and internal surface area of 265.7 cm$^2$. The CMC blocks tested have masses ranging from 35 to 38 g.

The CMC blocks were evaluated for flow rate performance and lead reduction performance against colloidal lead challenge water prepared as defined in NSF/ANSI 53 Protocol (2007). In addition to testing the gravity fed carbon blocks, several mixed media filters, containing granular activated carbon and ion exchange resin, were tested for comparative performance.

The following Table lists some of the formulations used in the following examples.

TABLE 1

| Filter Multiple Core (FIGS. 10A-F): | Lead Sorbent Type | Carbon Type | % Lead Sorbent | % Carbon | % Binder | Fill Weight |
|---|---|---|---|---|---|---|
| PA3-5 | Alusil™ [1] | PAC [2] | 20 | 40 | 40 | 36.5 |
| PA3-8 | Alusil | PAC | 20 | 40 | 40 | 36.0 |
| PT3-4 | ATS [3] | PAC | 20 | 40 | 40 | 39.5 |
| PT3-6 | ATS | PAC | 20 | 40 | 40 | 39.5 |
| PT3-5 alternate housing | ATS | PAC | 20 | 40 | 40 | 39.5 |
| PT3-11 | ATS | PAC | 20 | 40 | 40 | 40.0 |
| PT3-13 | ATS | PAC | 20 | 40 | 40 | 40.0 |
| PT3-51 | ATS | PAC | 20 | 40 | 40 | 40.0 |
| PT3-53 | ATS | PAC | 20 | 40 | 40 | 40.0 |
| P2-8 | N/A | PAC | 0 | 60 | 40 | 40.0 |
| P2-6 | N/A | PAC | 0 | 60 | 40 | 40.0 |

[1] Alusil - Selecto Scientific, Inc., 3980 Lakefield Court, Suwanee, GA 30024 Sodium Alumina silicate lead sorbent with diameter 40-70 μm.
[2] PAC - powder activated carbon with size 80 × 325 mesh.
[3] ATS Engelhard corporation 101 Wood Ave. Iselin, NJ 08830 Titanium Silicate zeolite lead sorbent with 25-30 μm diameter.

Example 3A

CMC blocks formulated with powder carbon fiber in varying ratios with lead sorbent and 40% ultra high molecular weight polyethylene binder with a melt flow less than 1.0 g/10 min. as determined by ASTM D 1238 at 190° C. and 15 kg load were tested by the method described in Example 3A. The results are shown in Table 2. PA1 blocks contained 40 wt. % binder, 50 wt. % powder carbon fiber (HMM 80×320), and 10 wt. % Alusil™ lead sorbent. PA2 blocks contained 40 wt. % binder, 45 wt. % powder carbon fiber, and 15 wt. % Alusil™ lead sorbent. PA3 blocks contained 40 wt. % binder, 40 wt. % powder carbon fiber, and 20 wt. % Alusil™ lead sorbent. PT2 blocks contained 40 wt. % binder, 50 wt. % powder carbon fiber, and 10 wt. % ATS lead sorbent. All blocks were tested with unrestricted flow through the filter except PT3-4. PT3-4 was tested in an alternate housing set-up in which the exit point for water from the filter was moved from the bottom of the filter towards the top. This restricted the flow rate in the block and forced the water to have extended contact with the block.

Figure 24:
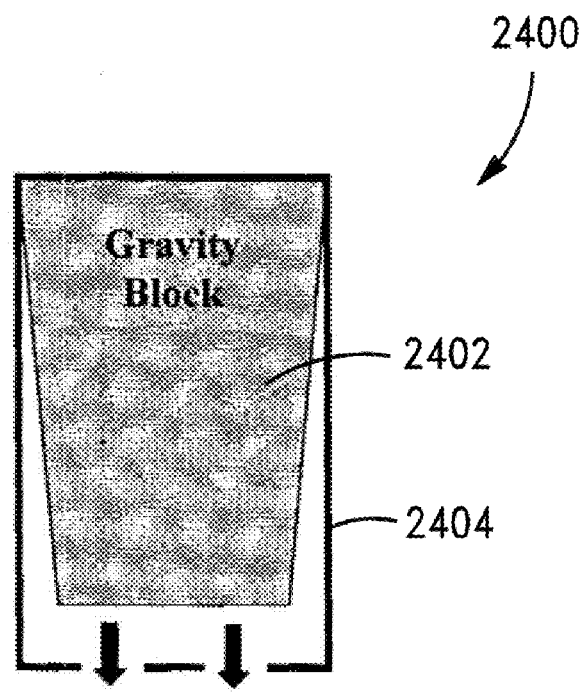
FIG. 24 illustrates a representative configuration of a filter set-up having virtually unlimited effluent flow.

FIG. 24 illustrates a representative configuration of a filter set-up 2400 having unlimited flow. In this example, a filter block 2402 is present in a housing 2404. Flow is unrestricted through the block 2402 and exits at the bottom of the housing 2404. There is no long term contact between the block 2402 and filtered water.

Figure 25:
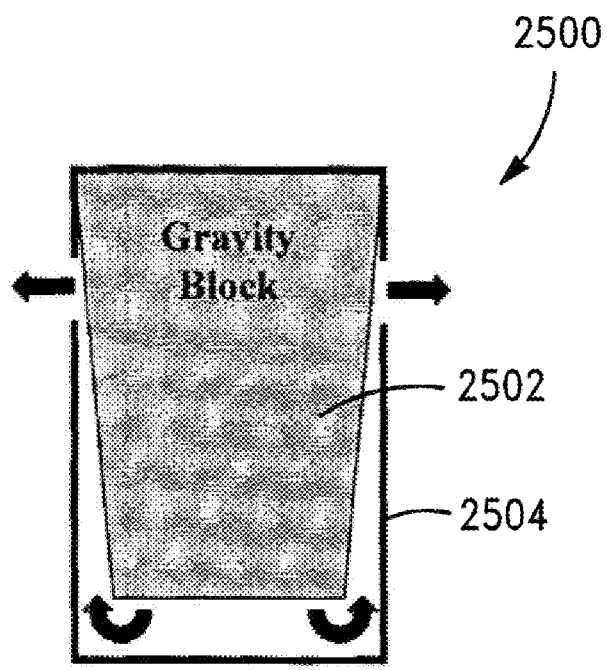
FIG. 25 depicts a representative configuration of a filter set-up where the exit point for effluent water is present towards the top of the housing.

FIG. 25 depicts a representative configuration of a filter set-up 2500 with a filter block 2502, where the exit point for water from the housing 2504 is moved from the bottom of the housing 2504 towards the top. In this case, the flow is restricted. Water is forced to stay in contact with the block 2502 longer as the housing 2504 fills with water before it exits at the upper holes.

Lead challenge water was formulated with 150 ppb lead with 45 ppb in colloidal form (size >0.1 microns). The colloidal lead is a challenge for gravity fed filters to remove whilst maintaining rapid filtrations rates (<7 min./liter). The flow rates were measured by filling a liter reservoir of a standard Brita® pitcher with the lead challenge water. The time required for the water to filter through the filtration material was recorded and the resulting effluent water was tested as indicated in Table 2. The filtrate effluents were collected after 3, 76, 151, 227, 273, and 303 liters of challenge water had been filtered. This corresponds to 2, 50, 100, 150, 180, and 200% of filter life. The total lead concentrations reported includes both colloidal and particulate form. The lead concentration was measured using an atomic adsorption spectrometer. The concentration of lead in the effluent and influent (challenge) water are displayed in ppb. Effluent values less than 10 ppb are desirable.

TABLE 2

| Liters Filtered | 3 L | 76 L | 151 L | 227 L | 273 L | 303 L | average |
|---|---|---|---|---|---|---|---|
| PA3-5 | | | | | | | |
| Effluent Total Pb Conc. (ppb) | 8.68 | 7.94 | 9.53 | 9.05 | 10.95 | 11.87 | 9.7 |
| Influent Total Pb Conc. (ppb) | 161.9 | 153.5 | 149.7 | 158.9 | 162.6 | 156.2 | 157 |
| Influent Sol. Pb Con. (ppb) | 112.8 | 108.8 | 106.7 | 116.1 | 112.4 | 109.8 | |
| % Colloidal Particulate Influent | 30.3 | 29.1 | 28.7 | 26.9 | 30.9 | 29.7 | 29 |
| % Total Pb Removed | 94.6 | 94.8 | 93.6 | 94.3 | 93.3 | 92.4 | |
| Flow Rate (min./liter) | 0:05:00 | 0:04:32 | 0:04:30 | 0:03:28 | 0:03:28 | 0:03:30 | 0:04:09 |
| PA3-8 | | | | | | | |
| Effluent Total Pb Conc. (ppb) | 7.24 | 5.86 | 7.45 | 7.01 | 8.21 | 8.47 | 7.4 |
| Influent Total Pb Conc. (ppb) | 166.7 | 156.6 | 150.2 | 169.8 | 165.3 | 161.3 | 162 |
| Influent Sol. Pb Con. (ppb) | 115.9 | 111.9 | 104.9 | 116.6 | 112.4 | 109 | |
| % Colloidal Particulate Influent | 30.5 | 28.5 | 30.2 | 31.3 | 32.0 | 32.4 | 31 |
| % Colloidal Particulate >1.2 microns | 39.2 | 31.8 | 23.0 | | | | 31 |
| % Total Pb Removed | 95.7 | 96.3 | 95.0 | 95.9 | 95.0 | 94.7 | |
| Flow Rate (min./liter) | 0:04:48 | 0:04:18 | 0:04:18 | 0:03:34 | 0:03:35 | 0:03:39 | 0:04:03 |
| PT3-4 | | | | | | | |
| Effluent Total Pb Conc. (ppb) | 6.76 | 5.42 | 6.25 | 6.67 | 7.84 | 8.55 | 6.9 |
| Influent Total Pb Conc. (ppb) | 163.3 | 157.2 | 150 | 166.1 | 161.2 | 160.1 | 160 |
| Influent Sol. Pb Con. (ppb) | 114.5 | 108.2 | 108.1 | 116 | 114.1 | 112.6 | |
| % Colloidal Particulate Influent | 29.9 | 31.2 | 27.9 | 30.2 | 29.2 | 29.7 | 30 |
| % Total Pb Removed | 95.9 | 96.6 | 95.8 | 96.0 | 95.1 | 94.7 | |
| Flow Rate (min./liter) | 0:05:19 | 0:04:31 | 0:04:29 | 0:03:39 | 0:03:36 | 0:03:37 | 0:04:13 |
| PT3-6 | | | | | | | |
| Effluent Total Pb Conc. (ppb) | 7.09 | 11.37 | 13.29 | 14.17 | 14.35 | 14.62 | 12.5 |
| Influent Total Pb Conc. (ppb) | 166.8 | 158.3 | 151.3 | 169.5 | 182.8 | 168.6 | 166 |
| Influent Sol. Pb Con. (ppb) | 118.7 | 111.5 | 106 | 115.8 | 113.5 | 112 | |
| % Colloidal Particulate Influent | 28.8 | 29.6 | 29.9 | 31.7 | 37.9 | 33.6 | 32 |
| % Colloidal Particulate >1.2 microns | | | | 36.5 | 53.1 | 42.0 | 44 |
| % Total Pb Removed | 95.7 | 92.8 | 91.2 | 91.6 | 92.1 | 91.3 | |
| Flow Rate (min./liter) | 0:20:19 | 0:04:22 | 0:04:08 | 0:03:02 | 0:03:06 | 0:03:05 | 0:03:51 |
| PT3-4 - alternate housing | | | | | | | |
| Effluent Total Pb Conc. (ppb) | 1.17 | 5.08 | 1.25 | 3.75 | 5.08 | 6.43 | 3.8 |
| Influent Total Pb Conc. (ppb) | 127.5 | 154.6 | 135.9 | 131.4 | 126 | 131.8 | 135 |
| Influent Sol. Pb Con. (ppb) | 106.7 | 109.6 | 105.6 | 90.6 | 88.6 | 84.6 | |
| % Colloidal Particulate Influent | 16.3 | 29.1 | 22.3 | 31.1 | 29.7 | 35.8 | 27 |
| % Colloidal Particulate >1.2 microns | | | 39.3 | 25.5 | 17.1 | 23.5 | 26 |
| % Total Pb Removed | 99.1 | 96.7 | 99.1 | 97.1 | 96.0 | 95.1 | |
| Flow Rate (min./liter) | 0:06:20 | 0:06:02 | 0:05:26 | 0:05:28 | 0:05:42 | 0:05:31 | 0:05:36 |
| PT3-11 | | | | | | | |
| Effluent Total Pb Conc. (ppb) | 7.69 | 6.94 | 8.46 | 5.42 | 3.34 | 4.21 | 6.0 |
| Influent Total Pb Conc. (ppb) | 181.6 | 172.1 | 164.5 | 148.5 | 142 | 134.4 | 157 |
| Influent Sol. Pb Con. (ppb) | 133 | 119.7 | 118.6 | 98.9 | 87.9 | 84.8 | |
| % Colloidal Particulate Influent | 26.8 | 30.4 | 27.9 | 33.4 | 38.1 | 36.9 | 32 |
| % Total Pb Removed | 95.8 | 96.0 | 94.9 | 96.4 | 97.6 | 96.9 | |
| Flow Rate (min) | 0:04:32 | 0:04:20 | 0:04:23 | 0:03:54 | 0:03:54 | 0:03:49 | 0:04:09 |
| PT3-13 | | | | | | | |
| Effluent Total Pb Conc. (ppb) | 8.78 | 7.73 | 9.2 | 3.7 | 4.16 | 4.62 | 6.4 |
| Influent Total Pb Conc. (ppb) | 185 | 170.5 | 167.5 | 145.6 | 133 | 127.1 | 155 |
| Influent Sol. Pb Con. (ppb) | 120.9 | 108.2 | 116.2 | 97.9 | 91 | 85.6 | |
| % Colloidal Particulate Influent | 34.6 | 36.5 | 30.6 | 32.8 | 31.6 | 32.7 | 33 |
| % Total Pb Removed | 95.3 | 95.5 | 94.5 | 97.5 | 96.9 | 96.4 | |
| Row Rate (min) | 0:04:25 | 0:04:11 | 0:04:15 | 0:03:57 | 0:03:49 | 0:03:52 | 0:04:04 |

All CMC blocks exhibited fast flow rates around 4 min./liter with good lead reduction performance. Two blocks reduce lead to below 10 ppb for 200% of filter life. The block tested with alternate housing showed improved lead reduction performance but also had slow flow rates, averaging 5:36 min./liter. The flow rate in the alternate block can be tuned by changing the size, number and location of the water exit holes.

Powder-carbon CMC blocks with a higher fill weight of material than the blocks above have also been tested. While the results are not shown, they demonstrate slightly slower flow rates. The Alusil™ containing blocks with higher fill weights exhibit decreased lead removal ability compared to the lower fill weight blocks. This may be due to inconsistent packing in the filter mold resulting in areas of high and low compaction. This would result in areas of preferential flow.

Areas with high flow rates would be used up more quickly. The ATS containing blocks performed better at the higher fill weight. This may be due to the higher density of ATS. The ATS containing formula may require more material to achieve the same compression as the Alusil™ blocks.

Example 3B

Mixed media filters containing granular carbon and ion exchange resin were tested by the method described in Example 3A. The results are shown in Table 3. The filters tested were the current BRITA® gravity-flow mixed media filter, the BRITA® Germany MAXTRA® gravity-flow mixed media filter, and the Proctor and Gamble PUR® 2-stage gravity-flow filter with pleated microfilter. All filters were prepped according the manufactures directions, which included 15 min. of soaking. All filters were tested in the pitcher provided by the manufacturers.

TABLE 3

| Liters Filtered | 3 L | 76 L | 151 L | 227 L | 273 L | 303 L | average |
|---|---|---|---|---|---|---|---|
| Brita Granular | | | | | | | |
| Effluent Total Pb Conc. (ppb) | 39.30 | 40.86 | 42.21 | 42.50 | 46.15 | 41.27 | 42.05 |
| Influent Total Pb Conc. (ppb) | 170.10 | 160.00 | 182.70 | 171.90 | 167.60 | 164.70 | 169.50 |
| Influent Sol. Pb Con. (ppb) | 118.30 | 109.90 | 107.60 | 117.50 | 116.90 | 115.40 | |
| % Colloidal Particulate Influent | 30.5% | 31.3% | 41.1% | 31.6% | 30.3% | 29.9% | 32.5% |
| % Total Pb Removed | 76.9 | 74.5 | 76.9 | 75.3 | 72.5 | 74.9 | |
| Flow Rate (min./liter) | 0:02:50 | 0:06:05 | 0:05:28 | 0:05:59 | 0:06:17 | 0:06:33 | 0:05:32 |
| Maxtra 55:45 | | | | | | | |
| Effluent Total Pb Conc. (ppb) | 36.43 | 40.85 | 43.77 | 45.46 | 46.04 | 45.59 | 43.02 |
| Influent Total Pb Conc. (ppb) | 170.00 | 159.90 | 153.20 | 165.80 | 164.10 | 166.60 | 163.27 |
| Influent Sol. Pb Con. (ppb) | 119.40 | 110.00 | 104.50 | 113.80 | 115.00 | 113.00 | |
| % Colloidal Particulate Influent | 29.8% | 31.2% | 31.8% | 31.4% | 29.9% | 32.2% | 31.0% |
| % Total Pb Removed | 78.6 | 74.5 | 71.4 | 72.6 | 71.9 | 72.6 | |
| Flow Rate (min./liter) | 0:04:41 | 0:04:51 | 0:04:51 | 0:04:39 | 0:04:40 | 0:04:42 | 0:04:44 |
| PUR 2stage | | | | | | | |
| Effluent Total Pb Conc. (ppb) | 4.85 | 26.06 | 30.24 | NA | NA | NA | 20.38 |
| Influent Total Pb Conc. (ppb) | 170.60 | 159.00 | 152.20 | NA | NA | NA | 160.60 |
| Influent Sol. Pb Con. (ppb) | 117.50 | 113.20 | 110.70 | NA | NA | NA | |
| % Colloidal Particulate Influent | 31.1% | 28.8% | 27.3% | NA | NA | NA | 29.1% |
| % Total Pb Removed | 97.2 | 83.6 | 80.1 | | | | |
| Flow Rate (min./liter) | 0:08:15 | 0:22:59 | 0:16:53 | NA | NA | NA | 0:16:02 |
| PUR 2stage | | | | | | | |
| Effluent Total Pb Conc. (ppb) | 2.89 | 32.38 | 38.60 | NA | NA | NA | 24.62 |
| Influent Total Pb Conc. (ppb) | 161.10 | 165.20 | 158.00 | NA | NA | NA | 161.43 |
| % Total Pb Removed | 98.2 | 80.4 | 75.6 | | | | |
| Flow Rate (min./liter) | 0:08:13 | 0:12:15 | 0:12:30 | NA | NA | NA | 0:18:52 |
| PUR 2stage | | | | | | | |
| Effluent Total Pb Conc. (ppb) | 2.95 | 32.56 | 39.56 | NA | NA | NA | 25.02 |
| Influent Total Pb Conc. (ppb) | 162.20 | 138.70 | 149.40 | NA | NA | NA | 150.10 |
| % Total Pb Removed | 98.2 | 76.5 | 73.5 | | | | |
| Flow Rate (min./liter) | 0:07:35 | 0:12:41 | 0:10:58 | NA | NA | NA | 0:15:29 |

All mixed media filters tested fail to adequately reduce total lead concentrations by 50% (75 liters) of filter life. The mixed media filters with the pleated micro filter screen have passing lead removal at 3 liters but then fail at higher quantities. The pleated micro filter results in slow flow rates with averages great than 15 min./liter over the lifespan of the filter (151 liters).

Example 4

Gravity fed carbon blocks were formed in two shapes: a multiple-core block (referred to as "CMC" block) having a shape as shown in FIGS. 10A-F, and a cylindrical block as shown in FIGS. 14A-E. The blocks are comprised of activated carbon in powder or fiber form, low melt flow high molecular weight binder of 1.0 g/10 min. as determined by ASTM D 1238 at 190° C. and 15 kg load, and a lead sorbent material. For the CMC block the surface area in contact with unfiltered water is defined as the interior portion and the upper surface above the lip (116, FIG. 10A). For the cylindrical block, the surface area in contact with unfiltered water is defined as the exterior surface, but not the upper or lower end surfaces.

TABLE 4

| | CMC Block (FIGS. 10A-F) | | Cylindrical Block (FIGS. 14A-E) | |
|---|---|---|---|---|
| Shape Units | in, in², g, g/in² | cm, cm³, g, g/cm³ | in, in², g, g/in² | cm, cm³, g, g/cm³ |
| volume of block | 5.41 | 88.67 | 9.21 | 151.00 |
| surface area in contact with unfiltered water | 13.90 | 89.64 | 24.66 | 159.44 |

TABLE 4-continued

| | CMC Block (FIGS. 10A-F) | | Cylindrical Block (FIGS. 14A-E) | |
|---|---|---|---|---|
| Shape Units | in, in², g, g/in² | cm, cm³, g, g/cm³ | in, in², g, g/in² | cm, cm³, g, g/cm³ |
| Wall thickness | 0.26 | 0.66 | 0.52 | 1.33 |
| fill weight low | 36.00 | | 36.00 | |
| fill weight high | 43.00 | | 43.00 | |
| block density low | 6.65 | 0.41 | 6.56 | 0.40 |
| block density high | 7.95 | 0.48 | 7.70 | 0.47 |

TABLE 4-continued

|  | CMC Block (FIGS. 10A-F) | | Cylindrical Block (FIGS. 14A-E) | |
| --- | --- | --- | --- | --- |
| Shape | in, in², | cm, cm³, | in, in², | cm, cm³, |
| Units | g, g/in² | g, g/cm³ | g, g/in² | g, g/cm³ |
| surface area in contact with unfiltered water/volume | 2.57 | 1.01 | 2.68 | 1.05 |

As noted in the Table above, the CMC blocks provide large surface areas in the given volumes.

Example 5

The following Table lists FRAP Factor Data for five filter shapes/types, the filters having formulations as presented above in Examples 3A-E, except as noted. Within the multiple-core blocks (FIGS. 10A-F), three different formulations are displayed (PA3, PT3, P2). Within the multiple-core blocks a wide range of preferred FRAP factors are demonstrated, ranging from 16.6 up to 223.1 FRAP.

Also shown are cylindrical filters. The mixed media filters fall above the preferred FRAP range (0-350).

TABLE 5

|  | L (gallons) | f (min/liter) | V (cm³) | $C_e$ (mg/liter) | FRAP Factor |
| --- | --- | --- | --- | --- | --- |
| Filter Multiple-Core: | | | | | |
| PA3-5 | 40 | 4.6 | 89 | 9.5 | 58.6 |
| PA3-8 | 40 | 4.4 | 89 | 7.5 | 45.7 |
| PT3-4 | 40 | 4.2 | 89 | 6.3 | 38.7 |
| PT3-6 | 40 | 4.6 | 89 | 13.3 | 78.5 |
| PT3-4 alternate housing | 40 | 4.6 | 89 | 1.3 | 16.6 |
| PT3-11 | 40 | 4.4 | 89 | 8.5 | 51.2 |
| PT3-13 | 40 | 4.2 | 89 | 9.2 | 52.7 |
| PT3-51 | 40 | 5.7 | 89 | 3.8 | 36.2 |
| PT3-53 | 40 | 5.1 | 89 | 2.3 | 24.2 |
| P2-8 lead sorbent free | 40 | 3.4 | 89 | 52.8 | 208.4 |
| P2-6 lead sorbent free | 40 | 2.3 | 89 | 87.1 | 223.1 |
| Cylindrical Block: | | | | | |
| Block 1 | 40 | 17.0 | 151 | 9.2 | 357.7 |
| Block 2 | 40 | 9.9 | 151 | 14.6 | 308.2 |
| Mixed Media: | | | | | |
| Brita Granular | 40 | 5.5 | 128 | 42.2 | 386.7 |
| German Maxtra | 40 | 4.9 | 145 | 43.8 | 402.3 |
| Pur 2 stage w/timer | 40 | 16.0 | 141 | 30.2 | 911.4 |
| Pur 2 stage w/timer | 40 | 10.4 | 141 | 36.6 | 706.8 |
| Pur 2 stage w/timer | 40 | 11.0 | 141 | 38.6 | 785.9 |

Figure 26:
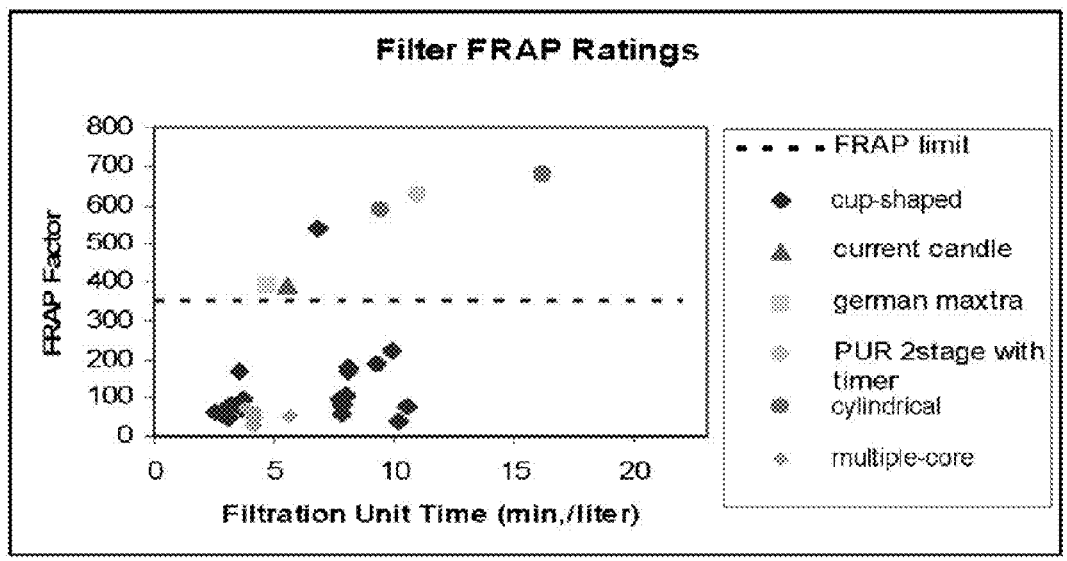
FIG. 26 is a chart depicting the FRAP ratings for mixed media filters currently on the market along with cup-shaped and multiple core gravity flow carbon blocks as a function of filtration unit volume.
Figure 27:
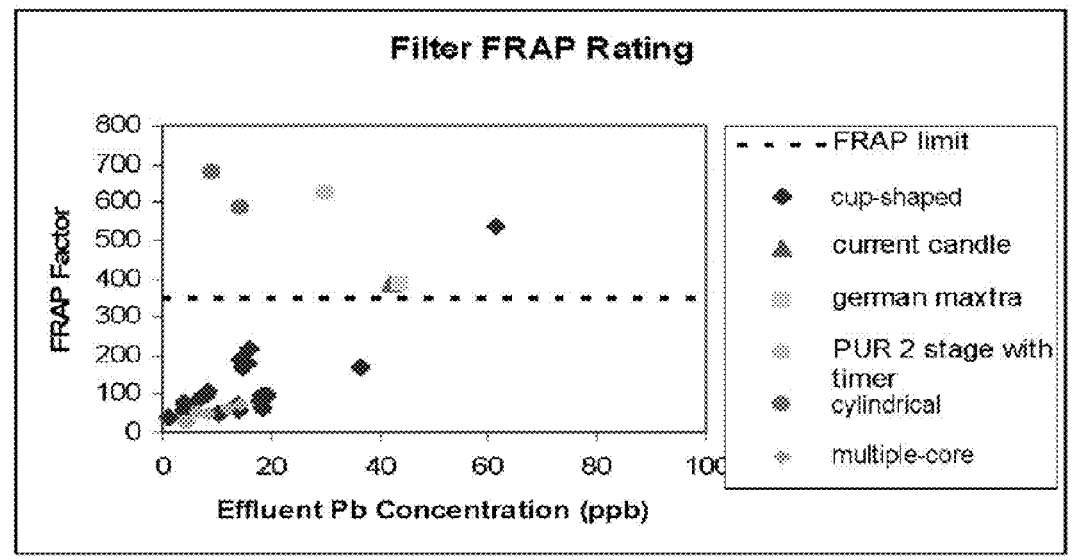
FIG. 27 is a chart depicting the FRAP ratings for mixed media filters currently on the market along with cup-shaped and multiple core gravity flow carbon blocks as a function of lead reduction performance.

FIGS. 26 and 27 are charts 2600, 2700 depicting the FRAP ratings as presented in Table 5 for mixed media filters currently on the market along with cup-shaped and multiple core gravity flow carbon blocks as a function of filtration unit volume and lead reduction performance, respectively. As shown, the multiple-core filters all had FRAP factors below 350, while the mixed media and cylindrical filters had FRAP factors above 350.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A gravity-fed water filter, comprising:
   filter media including at least activated carbon and a lead scavenger;
   wherein the filter achieves a Filter Rate and Performance (FRAP) factor of about 350 or less according to the following formula:

$$FRAP = \frac{[V * f * c_e]}{[L * 2]}$$

where:
V=volume of the filter media (cm³),
f=average filtration unit time over lifetime L (min/liter),
$c_e$=effluent lead concentration at end of lifetime L when source water having a pH of 8.5 contains 90-120 ppb (μg/liter) soluble lead and 30-60 ppb (μg/liter) colloidal lead greater than 0.1 μm in diameter, and
L=filter usage lifetime claimed by a manufacturer or seller of the filter (gallons).

2. The water filter as recited in claim 1, wherein the filter achieves a FRAP factor of less than about 200.

3. The water filter as recited in claim 1, wherein the volume of the filter media (V) is less than about 300 cm³.

4. The water filter as recited in claim 3, wherein the volume of the filter media (V) is less than about 150 cm³.

5. The water filter as recited in claim 1, wherein the average filtration unit time (f) is less than about 12 minutes per liter.

6. The water filter as recited in claim 5, wherein the average filtration unit time (f) is less than about 6 minutes per liter.

7. The water filter as recited in claim 1, wherein the filter media is present in the form of a block.

8. The water filter as recited in claim 7, further comprising a binder material interspersed with particles of the activated carbon.

9. The water filter as recited in claim 8, wherein the binder material has a melt index that is less than 1.8 g/10 min as determined by ASTM D 1238 at 190° C. and 15 kg load.

10. The water filter as recited in claim 8, wherein the binder material has a melt index that is about 1.0 g/10 min as determined by ASTM D 1238 at 190° C. and 15 kg load.

11. The water filter as recited in claim 7, wherein the filter fits within a container having a volume of less than about 20 in³.

12. The water filter as recited in claim 7, wherein the filter fits within a container having a volume of less than about 10 in³.

13. The water filter as recited in claim 7, wherein the block comprises multiple sub-blocks, each of the sub-blocks comprising filter media walls surrounding and defining a cavity for receiving fluid.

14. The water filter as recited in claim 7, wherein the block comprises multiple sub-blocks, each of the sub-blocks comprising filter media walls surrounding and defining on four sides a cavity for receiving fluid.

15. The water filter as recited in claim 13, wherein the block has an exterior space, gap, or recess between at least a portion of the multiple sub-blocks.

16. The water filter as recited in claim 7, wherein the block has an open top for receiving unfiltered water into a cavity thereof.

17. The water filter as recited in claim 7, wherein a median sidewall thickness of the block is less than about 0.6 inch.

18. The water filter as recited in claim 7, wherein a median sidewall thickness of the block is less than about 0.4 inch.

19. The water filter as recited in claim 7, wherein a structure of the block is characterized by having been compressed no more than 10% by volume during fabrication of the filter.

20. The water filter as recited in claim 1, wherein the filter media comprises primarily particles that are not bound together.

21. The water filter as recited in claim 1, wherein the filter media is present in the form of granular carbon.

22. The water filter as recited in claim 1, wherein the lead scavenger is a zirconia oxide or hydroxide.

23. A gravity-flow system for filtering water, comprising:
a container having a source water reservoir than can hold source water and a filtered water reservoir that can hold filtered water;
a cartridge in communication with both the source water reservoir and the filtered water reservoir, the cartridge providing a path through which water can flow from the source water reservoir to the filtered water reservoir; and
a filter as recited in claim 1 disposed within the cartridge.

24. The gravity-flow system as recited in claim 23, wherein the cartridge has an aperture through a sidewall thereof for allowing at least egress of air into the filtered water reservoir.

\* \* \* \* \*